United States Patent
Ogawa

(10) Patent No.: US 9,444,611 B2
(45) Date of Patent: Sep. 13, 2016

(54) NETWORK SYSTEM AND METHOD OF SYNCHRONIZING PATH INFORMATION

(71) Applicant: NEC CORPORATION, Tokyo (JP)

(72) Inventor: Hideki Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 15 days.

(21) Appl. No.: 14/371,993

(22) PCT Filed: Jan. 15, 2013

(86) PCT No.: PCT/JP2013/050596
§ 371 (c)(1),
(2) Date: Jul. 11, 2014

(87) PCT Pub. No.: WO2013/108761
PCT Pub. Date: Jul. 25, 2013

(65) Prior Publication Data
US 2015/0016477 A1    Jan. 15, 2015

(30) Foreign Application Priority Data

Jan. 16, 2012   (JP) .................................. 2012-006105

(51) Int. Cl.
*H04L 12/24* (2006.01)
*H04L 7/00* (2006.01)
*H04L 12/715* (2013.01)
(Continued)

(52) U.S. Cl.
CPC ......... *H04L 7/0016* (2013.01); *H04L 41/0866* (2013.01); *H04L 45/021* (2013.01); *H04L 45/38* (2013.01); *H04L 45/64* (2013.01); *H04L 67/327* (2013.01); *H04L 67/34* (2013.01)

(58) Field of Classification Search
CPC ........... H04L 12/4633; H04L 12/5689; H04L 1/0025; H04L 1/0027; H04L 1/1816
See application file for complete search history.

(56) References Cited

U.S. PATENT DOCUMENTS 7,522,627 B2    4/2009 Lam et al.
8,897,134 B2 *  11/2014 Kern .................. H04L 41/0816
                                                370/235
(Continued)

FOREIGN PATENT DOCUMENTS

CN          101009661 A      8/2007
JP         2009-055609 A     3/2009
(Continued)

OTHER PUBLICATIONS

English Translation of International Preliminary Report on Patentability in PCT No. PCT/JP2013/050596 dated Jul. 22, 2014.
(Continued)

*Primary Examiner* — Dang Ton
*Assistant Examiner* — Sai Aung
(74) *Attorney, Agent, or Firm* — McGinn IP Law Group, PLLC

(57) ABSTRACT

The network system has a switch and a controller. The switch performs processes of a received packet in accordance with a flow entry in which are defined a rule and an action to uniformly control a packet as a flow. The controller transmits a control message to the switch to perform a setting of the flow entry, holds a flow entry identical to the flow entry set to the switch, manages a synchronization state per unity of a flow entry and preferentially synchronizes, in a case the flow entry is not synchronized, a specific flow entry between the switch.

12 Claims, 15 Drawing Sheets

(51) Int. Cl.
*H04L 29/08* (2006.01)
*H04L 12/755* (2013.01)
*H04L 12/721* (2013.01)

(56) References Cited

U.S. PATENT DOCUMENTS

| | | | |
|---|---|---|---|
| 2004/0213148 A1* | 10/2004 | Willhite | H04L 45/00 370/225 |
| 2006/0092947 A1 | 5/2006 | O'Keeffe et al. | |
| 2009/0052445 A1 | 2/2009 | Folkes | |
| 2011/0044223 A1* | 2/2011 | Kim | H04L 1/1816 370/312 |
| 2011/0319116 A1* | 12/2011 | Iwamura | H04L 1/0026 455/517 |
| 2012/0314605 A1 | 12/2012 | Akiyoshi | |
| 2013/0010600 A1* | 1/2013 | Jocha | H04L 43/026 370/236.2 |
| 2013/0058351 A1* | 3/2013 | Casado | H04L 49/25 370/400 |
| 2013/0060929 A1* | 3/2013 | Koponen | H04L 12/4633 709/224 |

FOREIGN PATENT DOCUMENTS

| | | |
|---|---|---|
| JP | 2011-166384 A | 8/2011 |
| WO | WO 2011/108205 A1 | 9/2011 |

OTHER PUBLICATIONS

Japanese Office Action dated Jul. 14, 2015 with a partial English translation thereof.
Extended European Search Report dated Aug. 28, 2015.
International Search Report in PCT/JP2013/050596 dated Apr. 2, 2013 (English Translation Thereof).
Yasunobu Chiba et al., "A Study on Control Plane OAM Mechanism for OpenFlow Networks", IEICE Technical Report, Feb. 24, 2011, vol. 110, No. 448, pp. 329 to 334.
OpenFlow Switch SpecificationVersion 1.1.0Implemented,[online],Feb. 28, 2011 (URL:http://www.openflowswitch.org/documents/openflow-spec-v1.1.0.pdf).
Chinese Office Action dated Mar. 28, 2016 with an English translation thereof.

* cited by examiner

Fig. 7

| RULE | STATISTIC INFORMATION | ACTION | SYNCHRONIZATION FLAG |
|---|---|---|---|
|  |  |  |  |
|  |  |  |  |
|  |  |  |  |
| ⋮ | ⋮ | ⋮ | ⋮ |
|  |  |  |  |
|  |  |  |  |

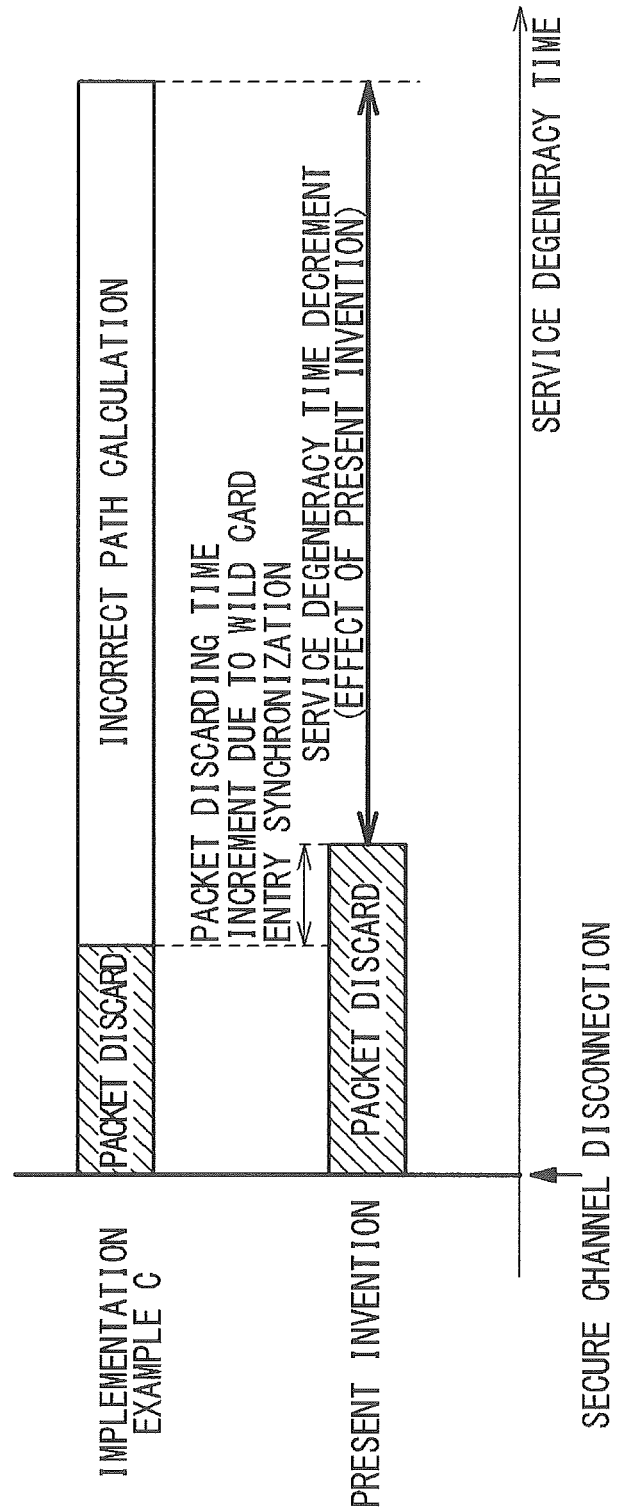

NETWORK SYSTEM AND METHOD OF SYNCHRONIZING PATH INFORMATION

TECHNICAL FIELD

The present invention is related to a network system, especially to a network system which synchronizes entries of path information.

BACKGROUND ART

[Description of a C/U Separation Type Network System]

As a method of controlling a network system, a C/U (C: control plane/U: user plane) separation type network system, which controls a node device (user plane) from an external control device (control plane), is proposed.

As an example of a C/U separation type network system, an OpenFlow network system can be given. The OpenFlow uses a technology of OpenFlow in which a switch is controlled via a controller to control a path of a network system. Details of the OpenFlow technology are disclosed in a Non-Patent literature 1. It should be noted that OpenFlow network system is only an example.

[Description of an OpenFlow Network System]

In an OpenFlow network system, conventional switch mechanism is separated into an OpenFlow controller and an OpenFlow switch. The OpenFlow controller is a module of which a path determination process can be changed by programming from outside. The OpenFlow switch is a module which performs only packet transfer process.

In the following, OpenFlow Controller will be denoted by "controller (OFC)" and OpenFlow Switch will be denoted by "switch (OFS)" for a simplification of the description.

In an OpenFlow network system, a controller (OFC) controls a flow table of a switch (OFS) to control a behavior of the switch.

A connection is realized between a controller (OFC) and a switch (OFS) by a secure channel which uses a control message complying with an OpenFlow protocol for the controller (OFC) to control the switch (OFS).

A switch (OFS) in an OpenFlow network system means an edge switch and a core switch which constitute an OpenFlow network and are under a control of a controller. A series of flows of packet, from a reception of packet by an input side edge switch in an OpenFlow network system to a transmission of packet by an output side edge switch, is called a Flow.

A packet can be read as a frame. A difference between a packet and a frame is merely a difference of PDU (Protocol Data Unit). A packet is a PDU of TCP/IP (Transmission Control Protocol/Internet Protocol). On the other hand, a frame is a PDU of Ethernet (registered trademark).

A flow table is a table in which a flow entry is registered. In a flow entry is defined a predetermined action to be performed in regard to a packet (communication data) which matches with a predetermined condition (rule).

A rule of a flow entry is defined by a various combination using any or all of a destination address included in a header area in each protocol layer of a packet, a source address, a destination port and a source port, and is distinguishable. It should be noted that above addresses include a MAC (Media Access Control) address or an IP (Internet Protocol) address. It should be also noted that, by addition to the above, ingress port information can be used as a flow entry rule. It should be noted also that a flow entry rule can be set with a header area value of a packet which shows a flow expressed in part (or in whole) by a regular expression of a wild card "*".

An action of a flow entry means an action such as "output to a specific port", "discard", "rewrite a header", etc. For example, if identification information of an output port (such as an output port number) is shown as an action of a flow entry, a switch output a packet to a corresponding port, and if no identification information of an output port is shown, the switch discards the packet. Or, if header information is shown in an action of a flow entry, the switch rewrites a header of the packet on a basis of corresponding header information.

A switch (OFS) in an OpenFlow network system performs an action of a flow entry to a group of packets which complies with a rule of the flow entry (packet series).

At present, an OpenFlow technology is in a period of transition from a phase of research to a phase of practical use. Operation tests for a practical use are executed in a large scale network of a data center or the like. In those tests, problems related to scalability are apparent such as a problem related to flow entry synchronization. For example, there is a problem in which, if a synchronization is performed for all switches and all flow entries, a service degeneracy time, occurring at a failure or a cluster switching, becomes very long. Therefore, a technology to improve such problems is desired.

CITATION LIST

Non Patent Literature

Non patent literature 1: "OpenFlow Switch Specification Version 1.1.0 Implemented", [online], Feb. 28, 2011, Internet (URL: http://www.openflowswitch.org/documents/openflow-spec-v1.1.0.pdf)

SUMMARY OF THE INVENTION

An objective of the present invention is to provide a network system which manages one synchronization status of a flow entry constituting a flow table in a C/U separation type network system, such as an OpenFlow network system, and performs synchronization (a partial synchronization of the flow table) for each flow table.

A network system related to the present invention includes: a switch which performs a process to a received packet in accordance with a flow entry in which a rule and an action to uniformly control a packet as a flow; and a controller which transmits a control message to the switch and performs a setting of the flow entry. The controller holds a flow entry which is identical to the flow entry set to the switch, manages a synchronization status in a flow entry unit and, if the flow entry is not synchronized, synchronizes a specific flow entry with priority with the switch.

In a method of path information synchronization related to the present invention, a switch performs a process to a received packet in accordance with a flow entry in which a rule and an action to uniformly control a packet as a flow. Furthermore, a controller transmits a control message to the switch and performs a setting of the flow entry. At this time, the controller holds a flow entry identical to the flow entry set to the switch, manages a synchronization status in a flow entry unit and, if the flow entry is not synchronized, synchronizes a specific flow entry with priority with the switch.

A program related to the present invention is a program to let an electronic device, such as a computer, execute the processes of the controller and the switch in the above method of path information synchronization. It should be noted that the program related to the present invention can be stored in a memory device or a recording medium.

As a result, a service degeneracy time, which occurs at failures and cluster switching, decreases in a C/U separation type network system such as an OpenFlow network system, etc.

BRIEF DESCRIPTION OF DRAWINGS

FIG. 7 is a diagram for describing about a flow table specification (format) related to the present invention.

FIG. 15 is a diagram for describing about a reason why a service can be shortened.

DESCRIPTION OF EXEMPLARY EMBODIMENTS

Preamble

The subject of the present invention is C/U separation type network system. Below will be described an example of an OpenFlow network system which is one of a C/U separation type network system. It should be noted that, in fact, the present invention is not limited to an OpenFlow network system.

[A Constitution of an OpenFlow Network System]

By referring to FIG. 1, a basic constitution example of an OpenFlow network system will be described.

A basic OpenFlow network system includes a controller (OFC) 10, a switch (OFS) 20 and a host 30.

Each of the controller (OFC) 10, the switch (OFS) 20 and the host 30 may be plural. For example, each one of a plurality of switches (OFS) 20 is denoted by a switch (OFS) 20-1, a switch (OFS) 20-2, etc.

The controller (OFC) 10 manages the switch (OFS).

The switches (OFS) 20 constitute a network.

The hosts 30 are connected to the switches (OFS) 20 and perform network communications via the switches (OFS) 20.

The controller (OFC) 10 and the switch (OFS) 20 are connected via a "secure channel" which is a communication path protected by a SSL (Secure Socket Layer). The controller (OFC) 10 and the switch (OFS) 20 perform a communication in accordance with an OpenFlow protocol via the secure channel.

The controller (OFC) 10 controls the way the switch (OFS) 20 processes a packet arriving to the switch (OFS) 20 by operating a flow entry.

As a result, the controller (OFC) 10 registers various flow entries to the switch (OFS) 20.

A set of flow entries is managed in a table format called "flow table".

Each of the switches (OFS) 20 holds at least one flow table. The controller (OFS) 10 holds flow tables with same contents as all flow tables held by each of the subordinate switches (OFS) 20. That is, the controller (OFC) 10 holds a master table of flow tables of each switch (OFS) 20.

It should be noted that "holding a flow table" means managing the flow table. If the flow table is manageable via a network or the like, the flow table actually needs not to exist inside the managing device itself. That is, the place to store a flow table is not limited to inside a device which manages the flow table and can be outside the device. For example, there may be a case where a controller (OFC) and a switch (OFS) share an identical flow table existing on a network.

A specification (format) of a flow entry is determined by the OpenFlow agreement.

[Specification (Format) of Flow Entry]

Figure 2:
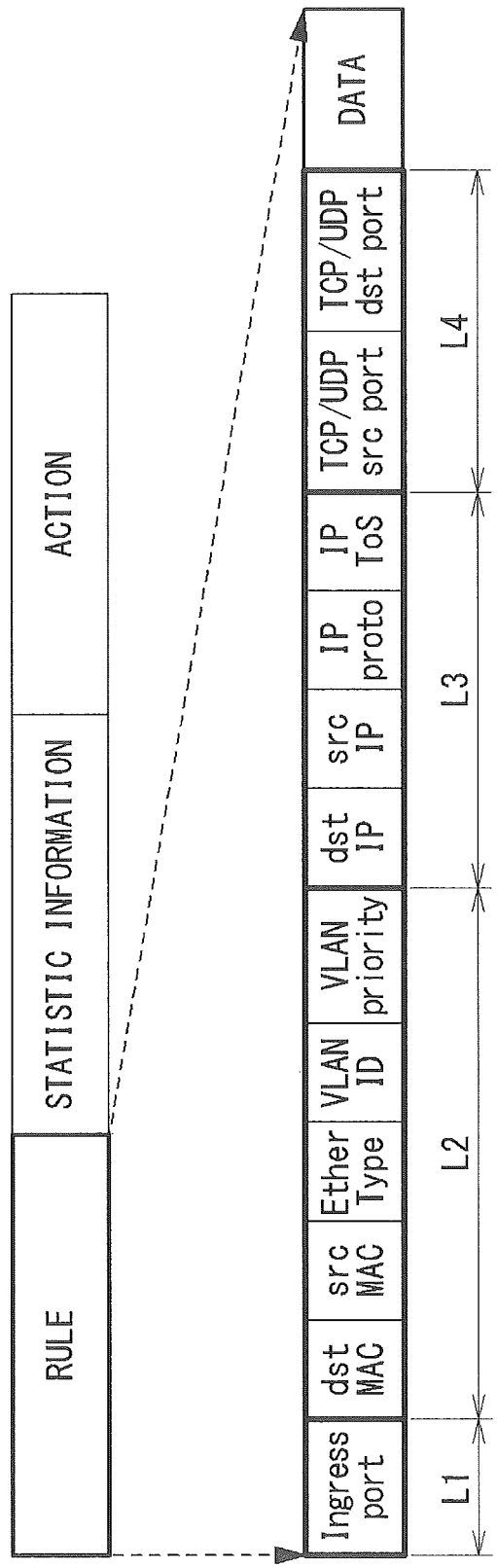
FIG. 2 is a diagram for describing about a specification (format) of a flow entry.

FIG. 2 will be referred to describe about a specification (format) of a flow entry.

A flow entry includes a column for a rule, a column for statistic information and a column for an action.

In a rule column, information (attribute values) from L1 (layer 1: physical layer) to L4 (layer 4: transport layer) of OSI (Open Systems Interconnection) reference model can be arbitrarily combined and specified. It should be noted that a broadcast address, a multicast address and the like can be specified in the rule column. Also, a wild card such as "*" or "?" can be used.

In a statistic information column, statistic information such as "total number of packets matched to a relevant entry", "time elapsed since last matching" and the like is stored.

In an action column, a content of a process such as "transferring a packet to switch A", "transferring to host B" or "discarding a packet" and the like can be specified as an action of a flow entry.

A switch (OFS) 20 processes a packet, which matches with a content described in a rule column, in accordance with a content described in an action column.

A controller (OFC) 10 registers such a flow entry to a switch (OFS) 20 to control processes to matching packets.

For a simple example, a controller (OFC) 10 can register a content "discard any packet transmitted from a host having an address 10.34.76.131 to a port 22 of a host having an address 10.34.81.100" as a flow entry to a switch (OFS) 20. In this case, the rule of the flow entry is "source IP address=10.34.76.131", "destination IP address=10.34.81.100" and "destination port number=22". Also, the action of the flow entry is "discard".

When a packet arrives, a switch (OFS) 20 reads header information (source information and destination information) of the relevant packet and searches for a flow entry having a rule which matches in a flow table of the switch itself.

As a result of the search, if a matching flow entry is found, the switch (OFS) 20 processes the packet as described in the flow entry action. It should be noted that if a plurality of flow entries are found, the packet is processed by the flow entry with the highest priority among the plurality of flow entries.

Also, as a result of the search, if no matching flow entry is found, the switch (OFS) 20 determines the relevant packet as the "first packet" and transfers a copy (replication) of the relevant packet to a controller (OFC) 10 to inquire the controller about how the relevant packet should be processed.

It should be noted that a "first packet" is a packet (new packet) which has arrived the first to a switch (OFS) 20 and is a packet which does not match with existing flow entries (unregistered packet).

When the controller (OFC) 10 receives an inquiry from the switch (OFS) 20, the controller (OFC) 10 performs a calculation of path and derives an optimal path to transfer a packet, of which the inquiry is received, to a destination.

Also, the controller (OFC) 10 newly registers in addition a flow entry for constituting the derived path to the flow table of the switch (OFS) 20. At this time, the controller (OFC) 10 newly registers in addition the same flow entry in the flow table of the controller (OFC) 10 itself.

The switch (OFS) 20 processes, in accordance with the flow entry newly registered in addition by the controller (OFC) 10, the relevant packet and further packets of the identical flow.

In an OpenFlow network system, a path to reach from a source host to a destination host can be determined by a "Dijkstra's algorithm" (a path search algorithm based on Dijkstra's method) which is conventionally known.

At this time, following information shown by (1) and (2) needs to be given to input for path calculation.

(1) Topology Information

Topology information is information of connection of hosts and switches which constitute the relevant network system and information registered in advance by a network manager or the like.

(2) Flow Entry Information

Flow entry information is information of flow entries in general which are already registered to each switch.

In a case where flow entry information is not given as input and the path is calculated or in a case where information given as input was wrong, there is a risk of a loop path to be constituted on a basis of a combination of a flow entry based on a path derived as a result of a path calculation and an existing flow entry.

Therefore, the controller (OFC) 10 holds a flow table with a content identical to a flow table of a subordinate switch (OFS) 20 to be able to refer to necessary information every time a path calculation is executed.

Figure 1:
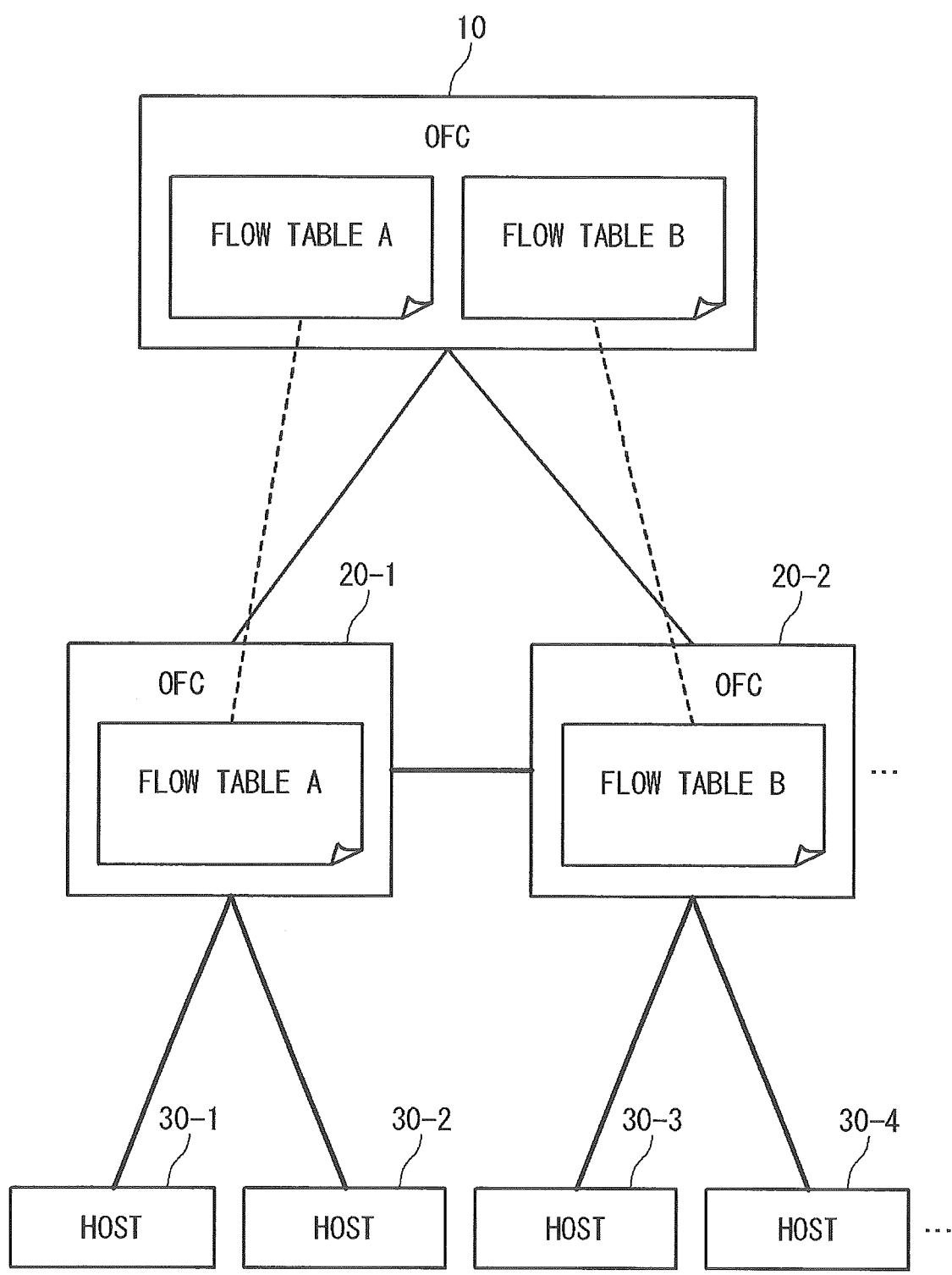
FIG. 1 is a diagram showing an example of constitution of a basic OpenFlow network system.

In an example of FIG. 1, the controller (OFC) 10 is holding its own flow tables; the content of those flow tables is identical to that of a flow table of the switches (OFS) 20, respectively.

The content of the flow table of the controller (OFC) 10 and the content of the flow table of the switch (OFS) 20 needs to be always the same so that the controller (OFC) 10 can always perform a correct calculation.

Thus, when any one of the flow tables is updated, both flow tables need to be updated so that their synchronized status be kept.

As examples of flow table updating can be given an additional registration and a deletion of a flow entry.

[Procedures of a Flow Entry Additional Registration]

Figure 3:
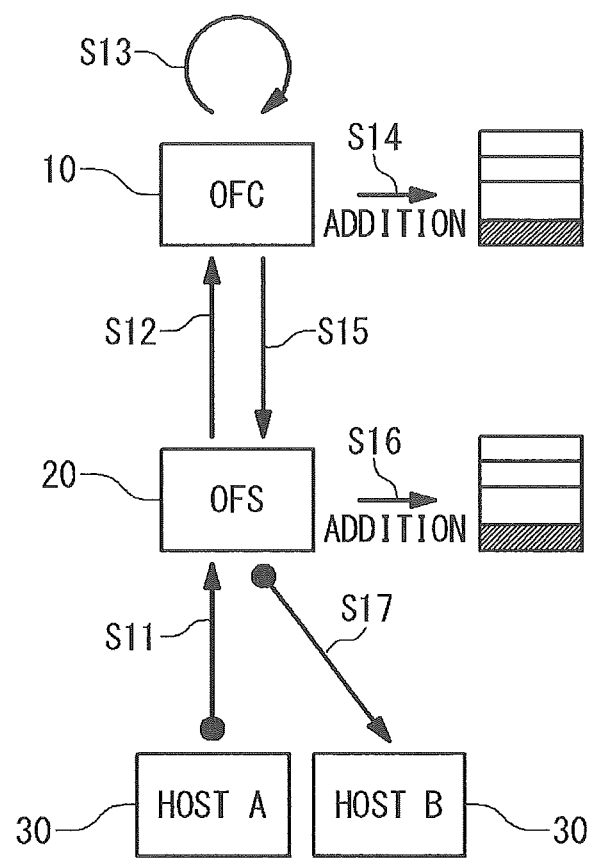
FIG. 3 is a diagram for describing about a procedure of registering a flow entry in addition.

Procedures of a flow entry additional registration will be described by referring to FIG. 3.

A flow entry is additionally registered in when a switch (OFS) 20 receives a first packet and inquires a path to a controller (OFC) 10 and the controller (OFC) 10 additionally registers a new flow entry to the switch (OFS) 20.

(1) Step S11

For example, a packet from a host A to a host B arrives to the switch (OFS) 20. The switch (OFS) 20 receives the relevant packet.

(2) Step S12

The switch (OFS) 20 searches in its own flow table for a flow entry which matches with the relevant packet. If the relevant packet is a first packet, no matching flow entry is found and the switch (OFS) 20 inquires a transfer path of the relevant packet to the controller (OFC) 10.

(3) Step S13

The controller (OFC) 10 calculates the transfer path of the relevant packet in response to the inquiry from the switch (OFS) 20.

(4) Step S14

The controller (OFC) 10 additionally registers a flow entry derived as a result of the calculation to its own flow table.

(5) Step S15

The controller (OFC) 10 transmits a control message instructing an additional registration of the flow entry to the switch (OFS) 20.

(6) Step S16

The switch (OFS) 20 newly and additionally registers the flow entry to its own flow table on a basis of the control message instructing to additionally register the flow entry.

(7) Step S17

The switch (OFS) 20 performs a transfer process of the relevant packet in accordance with a content disclosed in the newly and additionally registered flow entry.

It can be understood from the above that an additional registration process is synchronously performed to the flow table held in the controller (OFC) 10 side and the flow table held in the switch (OFS) 20 side.

However, if a failure such as a secure channel disconnection occurs during the time from the completion of (4) Step S14 to the completion of (6) Step S16, the synchronization becomes impracticable and consequently a difference occurs between the flow tables in the controller (OFC) 10 and the switch (OFS) 20.

[Procedures of a Flow Entry Deletion]

Figure 4:
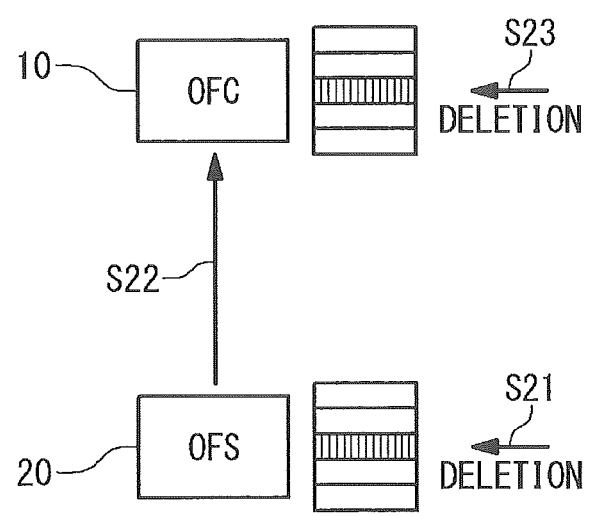
FIG. 4 is a diagram for describing about a procedure of deleting a flow entry.

Procedures of a flow entry deletion will be described by referring to FIG. 4.

As shown in "Procedures of a flow entry additional registration" above, a flow entry is newly and additionally registered each time a first packet arrives to the switch (OFS) 20.

However, since a storage area in the flow table is limited, the additional registration cannot be endlessly performed.

Thus, the number of flow entries will be kept equal or less than a given constant number by performing processes of deleting flow entries which have not matched during a given time or more.

(1) Step S21

The switch (OFS) 20 searches for a flow entry which has not matched during a given time or more in the flow entry of the switch (OFS) 20 itself and deletes the relevant flow entry.

(2) Step S22

The switch (OFS) 20 transmits to the controller (OFC) 10 a notification indicating that the relevant flow entry has been deleted.

(3) Step S23

The controller (OFC) 10 deletes a flow entry corresponding to the relevant flow entry from the flow table of the controller (OFC) 10 itself on a basis of the notification from the switch (OFS) 20.

It can be understood from the above that a deletion process is synchronously performed to the flow table held in the controller (OFC) 10 side and the flow table held in the switch (OFS) 20 side.

However, if a failure such as a secure channel disconnection occurs during the time from the completion of (1) Step S1 to the completion of (3) Step S23, a difference occurs between the flow tables in two sides.

It should be noted that it is determined to transmit an asynchronous message in (2) Step S22 by the OpenFlow regulation.

As described above, the flow tables held in the controller (OFC) 10 and the switch (OFS) 20 are basically updated by keeping a synchronized status but a difference may occur when the secure channel is disconnected.

Thus, to perform a correct calculation of path, a process of fixing the occurred differences is needed. The process of correcting the occurred difference will be called "audit process" (or synchronization process) hereinafter.

In the "audit process", the flow table held in the controller (OFC) 10 side is treated as correct information (true information) and a difference occurred in the flow table held in the switch (OFS) 20 side is corrected (synchronized).

The "audit process" involves difficulties shown below in (1) to (3).

(1) The "audit process" itself is a high load process.

(2) A correct path calculation cannot be performed until the "audit process" is complete.

(3) Regardless whether the "audit process" is complete or incomplete, packets continue arriving to the switch (OFS) 20 and thus, first packets may arrive before correction of difference.

In the "audit process", the difference needs to be corrected in flow tables of a number equivalent to the number of the managing switches (OFS) 20.

In the first place, the number of flow entries included in the flow table of each switch (OFS) 20 is enormous and thus, a commensurate time is required for processes of verifying and correcting differences.

Consequently, the larger the network scale is, the larger the throughput of the "audit process" is.

In addition, in general, the longer the time interval of the secure channel disconnection is, the larger the quantity of differences occurred between a pair of flow tables is.

For above reasons, in a large scale network, a case where a controller (OFC) 10 performs cluster switching processing is a typical example where a high load "audit process" is necessary.

It should be noted that a cluster switching process is a process of switching roles of nodes in a system constructed with operating (Active) nodes and standby nodes (Standby), such as a cluster system, a fault tolerant system and the like.

[Cluster Switching Process of a Controller (OFC) 20]

A case where a controller (OFC) 10 performs a cluster switching process will be described, by referring to FIG. 5.

Figure 5:
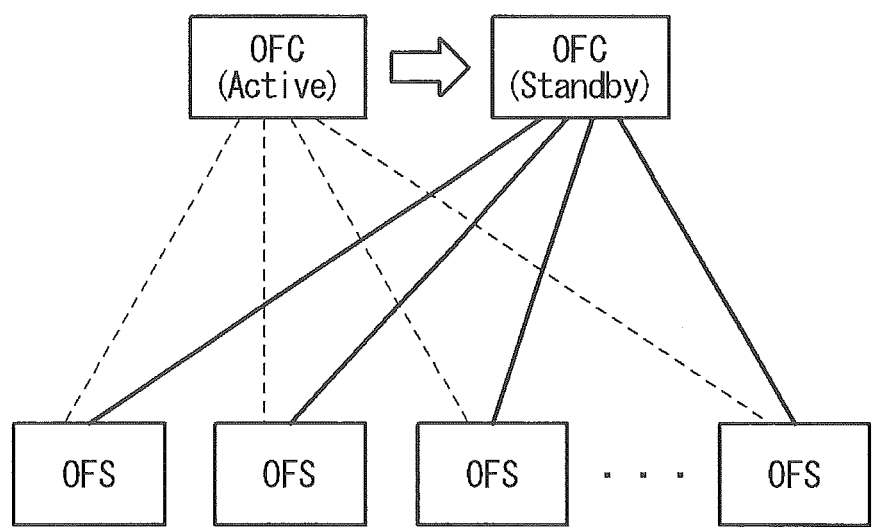
FIG. 5 is a diagram for describing about a cluster switching procedure of a controller.

As shown in FIG. 5, when the controller (OFC) 10 is switched from operating state (Active) to standby state (Standby), a high load "audit process" is necessary.

In such case, the difficulties of "audit process" as shown above as (1)-(3) might manifest themselves.

A conventional "audit process" performs a synchronization process per unity of flow table and no mechanism or technique was proposed to perform a synchronization process per unity of flow entry.

Audit Process Implementation Examples

Some examples of implementing "audit process" which synchronizes per unity of flow table (implementation examples A, B and C) will be described by referring to FIG. 6.

Implementation Example A

The first packet is held in a pending state until "audit process" is completed in every flow tables.

For example, after the secure channel disconnection, the controller (OFC) 10 performs the "audit process" of the switches (OFS) 20, for one switch after the other switch; and when the "audit process" is completed for N switches, the controller (OFC) 10 starts the path calculation. In a case where the first packet arrives to the switch (OFS) 20 during the "audit process", a path calculation process is required. However, since the "audit process" is en route, if the path is immediately calculated, there is a possibility that the calculation result is incorrect. Therefore, the path calculation is set in a pending state until the "audit process" is completed. And, when the "audit process" is completed, packets are processed by path calculation in arriving order. The first packet in pending state is to be stored in a queue in the switch (OFC) 20.

In the present implementation example A, no critical problem occurs in a case where the network scale is small and the time spent by the "audit process" is short enough or in a case where traffic quantity is small and the number of arrived first packets is small. Just a network delay derived from pending path calculation may occur (successful case of implementation example A in FIG. 6).

However, in a case where the network scale is large and "audit process" requires a long time or in a case where the traffic quantity is large and a large number of first packets arrive to the switch (OFS) 20, the queue in the switch (OFS) 20 may overflow. In such case, the switch (OFS) 20 will be down (stopped) and the network will appear to have down to users. In addition, tasks to restore devices will be required and users will be unable to use the network until restoration (failed case of implementation example A in FIG. 6).

Implementation Example B

No first packet is accepted until "audit process" is completed in every flow tables.

The implementation example B is an improvement of the implementation example A.

For example, after the secure channel is disconnected, the controller (OFC) 10 performs the "audit process" for each of the switches (OFS) 20 (one switch after the other switch); and when the "audit process" is completed for N switches, the controller (OFC) 10 starts the path calculation. Those steps are same as in the implementation example A.

In addition, in a case where a first packet arrives while the "audit process" is en route and the path is immediately calculated, there is a possibility that the calculation result is incorrect. However, if first packets are held in a pending state and stored in the queue in the switch (OFS) 20, there is a possibility that the queue overflows and the switch (OFS) 20 downs. Therefore, the switch (OFS) 20 will discard first packets arriving during "audit process". By doing so, the switch (OFS) 20 does not down.

However, during the "audit process", first packets are discarded by the switch (OFS) 20 and do not arrive to the destination. Consequently, the network appears to the users to be down (implementation example B in FIG. 6).

Implementation Example C

The first packets are not accepted until a minimum of "audit process" is completed.

It should be noted that, after the minimum of "audit process" is completed, first packets are accepted and path calculations are performed.

The implementation example C is a further improvement of the implementation examples A and B and can shorten the time during which the network is down.

For example, after the secure channel is disconnected, the controller (OFC) 10 synchronizes just flow entries of broadcast (BC) and multicast (MC) among flow entries in the flow table, before other flow entries.

A flow entry of broadcast (BC) ("BC entry" hereinafter) is a flow entry of which a broadcast address is set as a destination address according to flow entry rules.

A flow entry of multicast (MC) ("MC entry" hereinafter) is a flow entry of which a multicast address is set as a destination address according to flow entry rules.

First, the controller (OFC) 10 synchronizes the BC entry or MC entry between its own flow table and the flow table of the switch (OFS) 20 to enable a minimum of packet transfer.

In addition, the switch (OFS) 20 discards first packets arriving during synchronization of BC entry or MC entry is processed.

After the synchronization process of BC entry or MC entry is completed, the controller (OFC) 10 accepts inquiries from the switch (OFS) 20 about first packets arrived to the switch (OFS) 20 and sequentially processes.

At this point, every flow entries are not synchronized and thus path calculation might be incorrect; however, since pending might down the switch (OFS) 20, inquiries about first packets are accepted and sequentially path calculations are executed. In addition, synchronization processes for remaining flow entries are processed in parallel with the path calculations.

Figure 6:
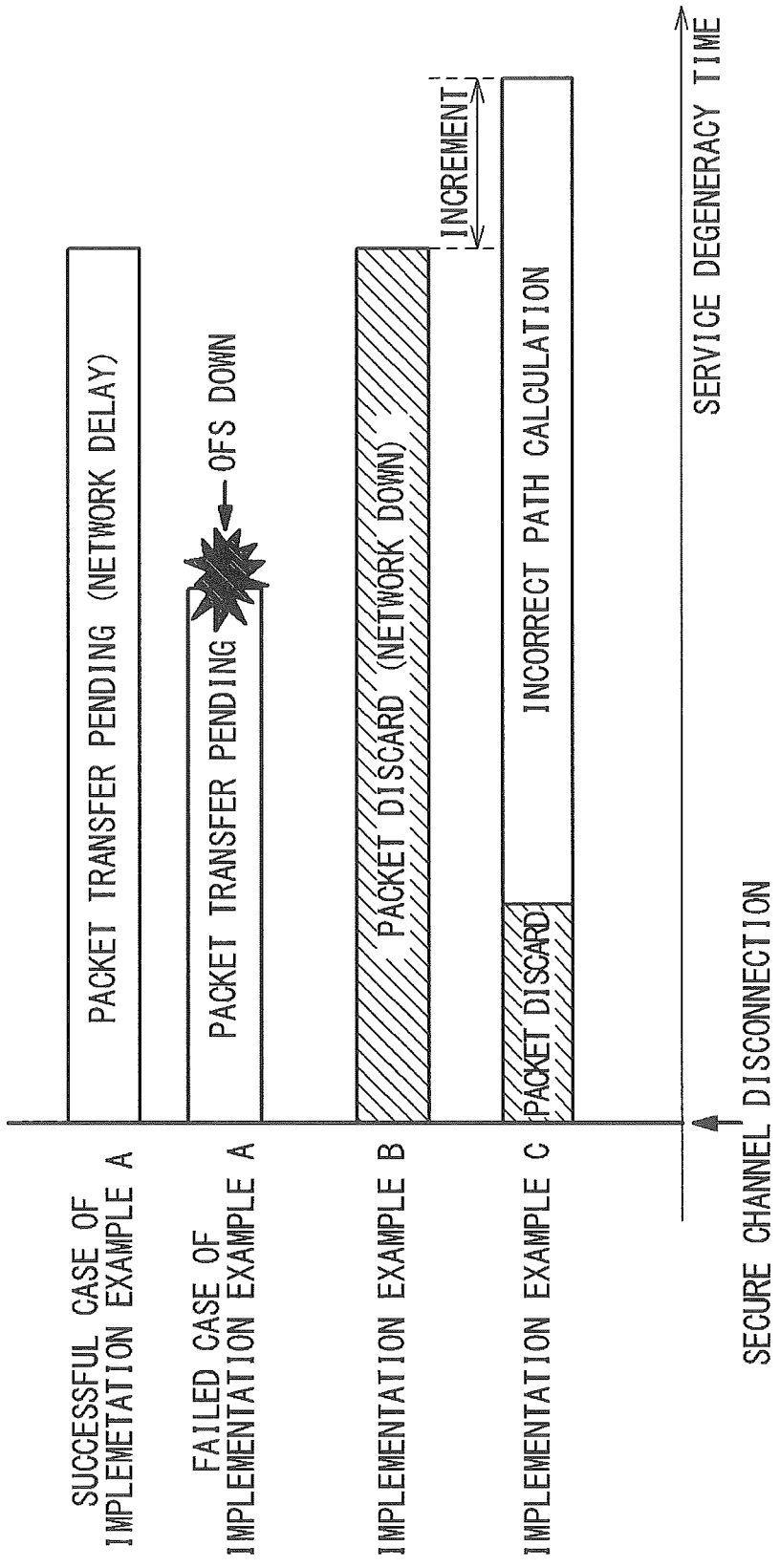
FIG. 6 is a diagram for describing about an implementation example of an "audit process" (synchronization process).

Consequently, in comparison with the implementation example B, the duration of a network down (of a high failure level) can be shortened; however, on the other hand, a duration while which path calculation is incorrect might occur (implementation example C in FIG. 6).

In addition, in the implementation example C, since "audit process" is performed in parallel with path calculations, total time required for "audit process" increases. Thus, service degeneracy time might increase in comparison with the implementation example B ("increase" portion in the implementation example C in FIG. 6).

As described above, due to difficulties of "audit process" such as above (1)-(3), especially in a large scale network configuration, in a case of performing cluster switch process or in a case where failure such as secure channel disconnection occurs, a service degeneracy time occurs. Thus, a technique is required to shorten the service degeneracy time in such situations.

Exemplary Embodiment

Below will be described an exemplary embodiment of the present invention by referring attached drawings.

Necessary flow entries are limited when a first packet arrives to a switch (OFS) and its path is calculated.

Flow entries which match with a source or a destination of the relevant packet only are necessary; flow entries which do not match do not affect a calculation result at all.

Therefore, every flow tables and every flow entries need not to be synchronized for a path calculation of a first packet. A beforehand synchronization of entries matching to the relevant first packet is enough. That is, not an integral audit process but a partial audit process is enough to be executed.

In the above described implementation examples A and B, the controller (OFC) managed 2 states only: whether the synchronization of every flow tables of N switches is complete or incomplete.

In the above described implementation example C, the controller (OFC) managed 2 states only: whether the synchronization of every BC entries or MC entries in flow tables of N switches is complete or not.

Therefore, flow entries, which were in fact not necessary for path calculation, were synchronized to perform path calculation.

In the present invention, as shown in FIG. 7, each flow entry is provided in its flow table a column showing a synchronized state of the related flow entry.

[Specification (Format) of Flow Table Related to the Present Invention]

A specification (format) of a flow table related to the present invention will be described below, by referring to FIG. 7.

The flow table related to the present invention includes a rule column, a statistic information column, an action column and a synchronization flag column.

In the rule column, according to flow entry rules, information (attributes) among L1 (Layer 1, physical layer) to L4 (transport layer) in OSI reference model can be arbitrarily combined and designated. It should be noted that a broadcast address or a multicast address can be designated in the rule column. In addition, a wild card such as "*" or "?" can also be used.

In the statistic information column, statistic information such as "a total number of packets matching to the relevant entry" or "an elapsing time since the last matching" can be stored.

In the action column, a content of process such as "transfer the packet to the switch A", "transfer the packet to the host B" or "discard the packet" can be designated as an action of the flow entry.

In the synchronization column, one value between "true" or "false" is inputted.

"True" is a value which shows that the flow entry can be guaranteed to be already synchronized.

"False" is a value which shows that the flow entry cannot be guaranteed to be synchronized.

Those contents of the flow table are common to both of the controller (OFC) and the switch (OFS).

In addition, a "synchronization flag changing unit", which controls the value of this synchronization flag, is provided to both of the controller (OFC) and the switch (OFS). As a result, synchronization state of each flow entry in both the controller (OFC) and the switch (OFS) can be managed.

In addition, a "partial synchronization process unit", which synchronizes only flow entries matching to specific packets, is provided to the controller (OFC). As a result, at an arrival of a first packet, just a necessary portion of flow entries can be synchronized, no unnecessary pending time occurs and path calculation can be correctly performed.

Consequently, the time while the path calculation is incorrect, which occurred in the implementation example C, does not occur anymore, and thus, the total length of the service degeneracy time can be shortened.

In the above implementation example C, BC entries or MC entries were synchronized at first.

In the present invention, in addition to BC entries and MC entries, wild card entries also are to be synchronized at first.

The wild card entries means flow entries in which a wild card is used in at least one of four columns (specific four columns), which are the destination MAC address (dst MAC), the source MAC address (src MAC), the destination IP address (dst IP) and the source IP address (src IP), in accordance with flow entry rules.

Hereinafter, a BC entry, a MC entry and a wild card entry will be called "specific entry".

In addition, a flow entry which is not a specific entry will be called "ordinary entry".

An ordinary entry is a flow entry in which no wild card is used but a concrete value is inputted in the specific four columns and no broadcast address or multicast address is inputted in an address input column.

In addition, a switch (OFS) has a specific entry full synchronization flag.

The specific entry full synchronization flag is: "true" in a case where all of the BC entries, MC entries and wild card entries, which are already set, are synchronized; and "false" otherwise.

When a packet arrives to a switch (OFS) and an ordinary entry of which the specific four columns match with the relevant packet is searched in the flow table, zero or more ordinary entry of which the specific four columns match with the relevant packet is/are detected.

[Network Configuration]

Figure 8:
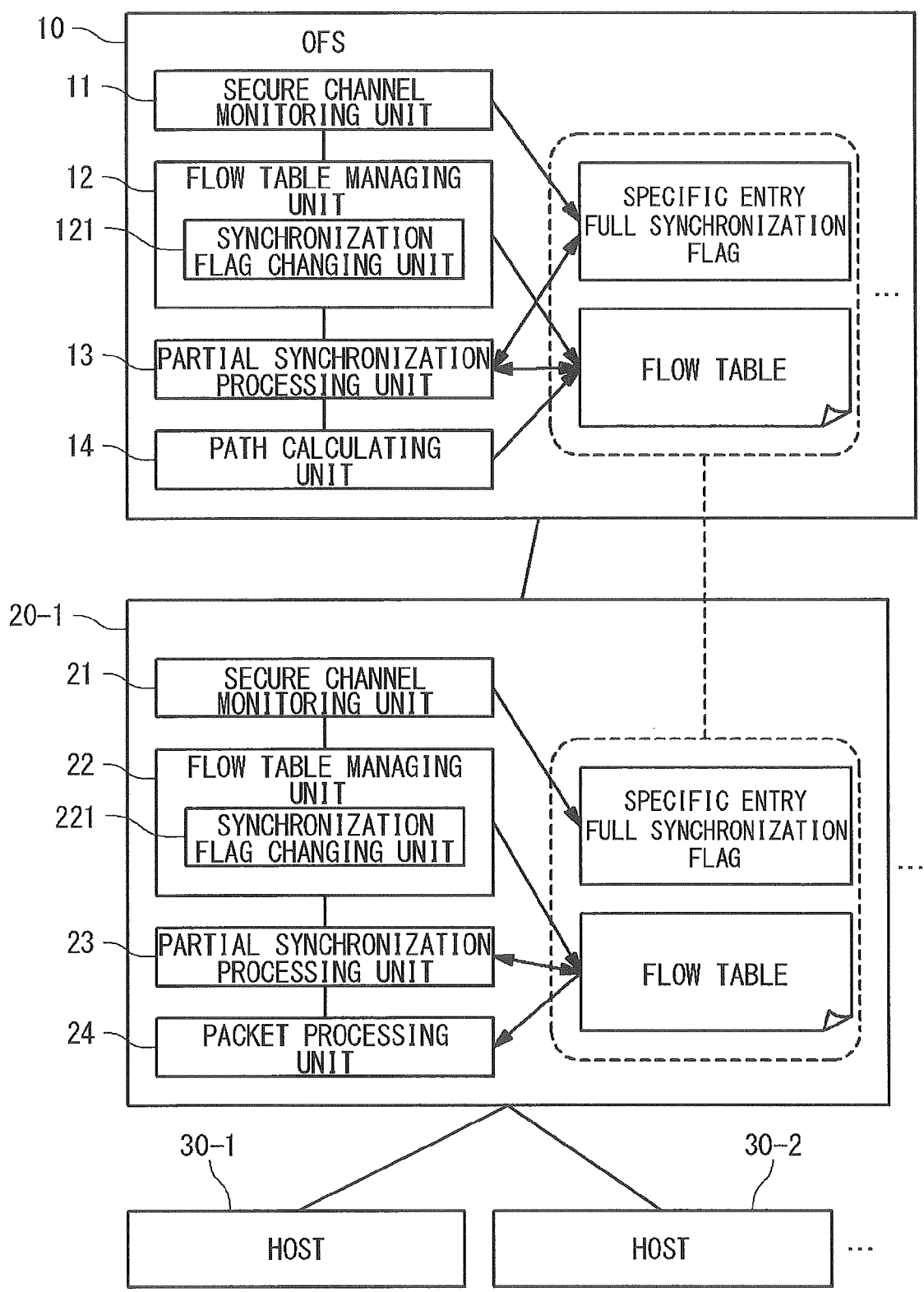
FIG. 8 is a diagram showing a constitution example of a network system related to the present invention.

A configuration example of a network system related to the present invention will be described in detail by referring to FIG. 8.

The network system related to the present invention includes a controller (OFC) 10, switches (OFS) 20 and hosts 30.

The controller (OFC) 10 manages the switches (OFS).

The switches (OFS) 20 constitute the network.

The hosts 30 are connected to the switch (OFS) 20 and perform network communication via the switch (OFS) 20.

The controller (OFC) 10 and the switch (OFS) 20 are connected via a secure channel. The controller (OFC) 10 and the switch (OFS) 20 perform communications through the secure channel and in accordance with the OpenFlow protocol.

The controller (OFC) 10 operates a flow entry to control how the switch (OFS) 20 processes packets arriving to the switch (OFS) 20.

The switch (OFS) 20 holds at least one flow table. The controller (OFC) 10 holds flow tables with same contents than flow tables of all underlying switches (OFS) 20. That is, the controller (OFC) 10 holds a master table of each underlying switch's flow table. The flow table of the switch (OFS) 20 is a copy (duplicate) of the flow table of the controller (OFC) 10.

In addition, the controller (OFC) 10 has a specific entry full synchronization flag for each of switch (OFS) the controller manages.

[Controller (OFC) Configuration]

Next, a configuration example of the controller (OFC) 10 will be described.

The controller (OFC) comprises a secure channel monitoring unit 11, a flow table managing unit 12, a partial synchronization processing unit 13 and a path calculating unit 14.

The secure channel monitoring unit 11 monitors the secure channel through which the controller (OFC) 10 and the switch (OFS) 20 perform communications and detects a communication interruption when it occurs.

The flow table managing unit 12 manages the flow table of the controller (OFC) 10.

It should be noted that the flow table managing unit 12 includes a synchronization flag changing unit 121.

The synchronization flag changing unit 121 changes the synchronization flag value of the flow table of the controller (OFC) 10.

The partial synchronization processing unit 13 synchronizes BC entries, MC entries or wild card entries, which are specific entries, between the flow table of the controller (OFC) 10 and the flow table of the switch (OFS) 20. That is, the partial synchronization processing unit 13 does not perform processes of synchronizing all flow entries (full audit process) but perform processes of synchronizing only specific entries at first (partial audit process).

The path calculating unit 14 receives a path calculation request from the switch (OFS) when the first packet arrives to the switch (OFS) and derives a flow entry to the relevant packet. At this time, the flow table of the controller (OFC) 10 is referred as an input of the path calculation.

[Switch (OFS) Configuration]

Next, a configuration example of the switch (OFS) 20 will be described.

The switch (OFS) 20 comprises a secure channel monitoring unit 21, a flow table managing unit 22, a partial synchronization processing unit 23 and a packet processing unit 24.

The secure channel monitoring unit 21 monitors the secure channel through which the controller (OFC) 10 and the switch (OFS) 20 perform communications and detect a communication interruption when it occurs.

The flow table managing unit 22 updates the flow table of the switch (OFS) 20.

It should be noted that the flow table managing unit 22 includes the synchronization flag changing unit 221.

The synchronization flag changing unit 221 changes the synchronization flag value of the flow table of the switch (OFS) 20.

The partial synchronization processing unit 23 synchronizes BC entries, MC entries or wild card entries, which are specific entries, between the flow table of the controller (OFC) 10 and the flow table of the switch (OFS) 20.

The packet processing 24 searches for a flow entry, which matches with a packet received from a host or a switch, in the flow table of the switch (OFS) 20 and, if a matching flow entry is detected, processes the packet in accordance with the content described as the action of the matching flow entry. For example, processes such as transferring a packet to a host or another switch, discarding a packet or the like are performed. In addition, in a case where no matching flow entry is detected (first packet case), the packet processing 24 transfers a copy of the first packet to the controller (OFC) 10 to request a path calculation, waits for an additional registration of a flow entry from the controller (OFC) 10 and, if there is an additional registration of a flow entry, appropriately processes the packet in accordance with the content described as the action of the additionally registered flow entry.

[Operations of the Secure Channel Monitoring Units]

Figure 9:
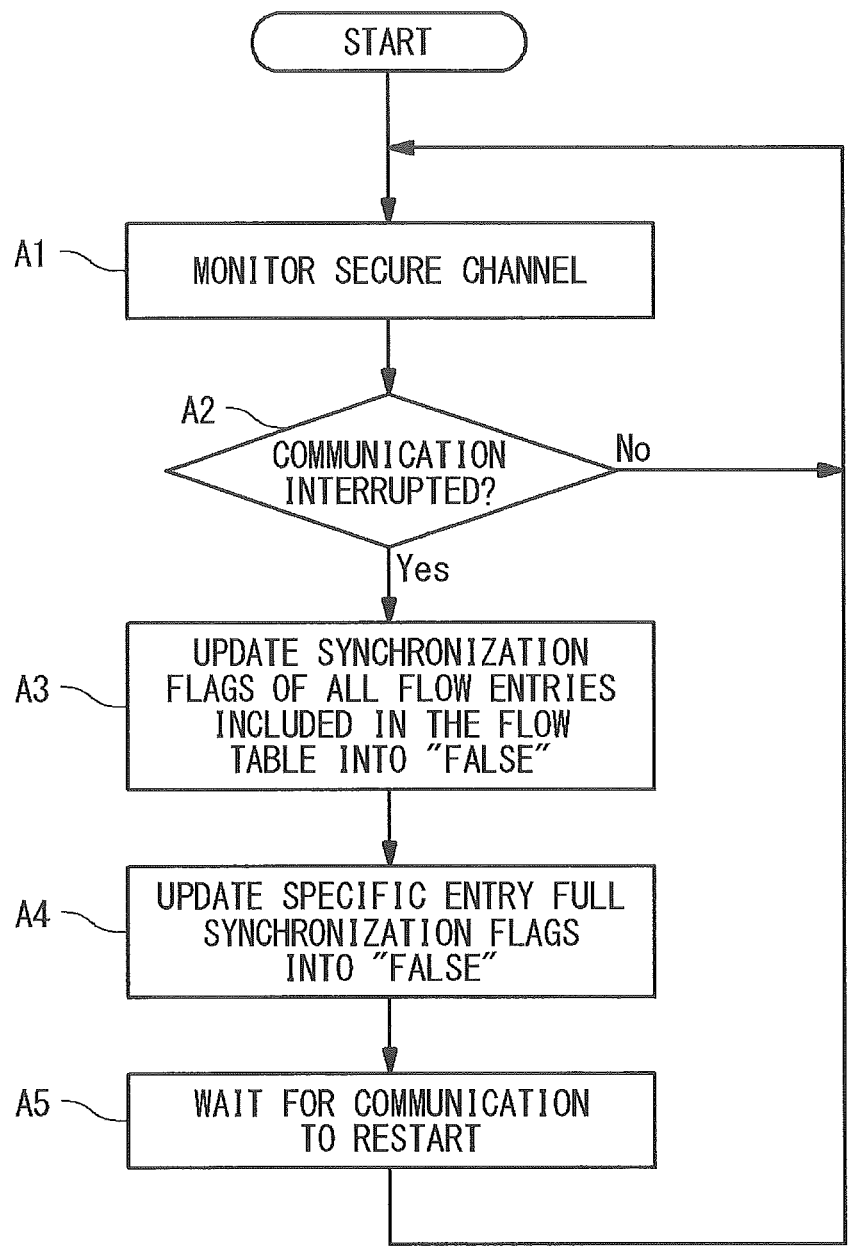
FIG. 9 is a flowchart showing operations of a secure channel monitoring section.

Operations of the secure channel monitoring unit 11 in the controller (OFC) 10 and the secure channel monitoring unit 21 in the switch (OFS) 20 will be described by referring to FIG. 9.

It should be noted that the secure channel monitoring unit 11 and the secure channel monitoring unit 21 start their operations after each device of the controller (OFC) 10 and the switch (OFS) 20 has started up and secure channel communication has begun.

(1) Step A1

The secure channel monitoring unit 11 and the secure channel monitoring unit 21 monitor the secure channel.

(2) Step A2

Next, the secure channel monitoring unit 11 and the secure channel monitoring unit 21 detect whether the communication is interrupted or not. While the communication is correctly performed, the monitoring is continued.

(3) Step A3

When detecting the communication interruption, the secure channel monitoring unit 11 and the secure channel monitoring unit 21 update the values of the synchronization flags of all flow entries (all of both specific entries and ordinary entries) included in the flow tables into "false".

For example, when detecting the secure channel communication interruption, the secure channel monitoring unit 11 of the controller (OFC) 10 instructs the flow table managing unit 12 to update all synchronization flag columns of the controller (OFC) 10 into "false". The synchronization flag changing unit 121 of the flow table managing unit 12 updates all of synchronization flag columns of the flow table of the controller (OFC) 10 into "false", according to the instruction. This flow table corresponds to the flow table of the switch (OFS) 20 connected to the relevant secure channel.

In addition, when detecting the secure channel communication interruption, the secure channel monitoring unit 21 of the switch (OFS) 20 instructs the flow table managing unit 22 to update all of synchronization flag columns of the flow table of the switch (OFS) 20 into "false". The synchronization flag changing unit 221 of the flow table managing unit 22 updates all of the synchronization flag columns of the flow table of the switch (OFS) 20 into "false", in accordance with the instruction.

(4) Step A4

Next, the secure channel monitoring unit 11 and the channel monitoring unit 21 update the values of all of specific entry full synchronization flags into "false".

For example, when detecting the secure channel communication interruption, the secure channel monitoring unit 11 of the controller (OFC) 10 updates the values of all of specific entry full synchronization flags of the controller (OFC) 10 into "false". This specific entry full synchronization flag corresponds to the specific entry full synchronization flag of the switch (OFS) 20 connected through the relevant secure channel.

In addition, when detecting the secure channel communication interruption, the secure channel monitoring unit 21 of the switch (OFS) 20 updates the specific entry full synchronization flag value of the switch (OFS) 20 into "false".

(5) Step A5

After that, the secure channel monitoring unit 11 and the secure channel monitoring unit 21 wait for the secure channel communication to restart to restart the communication monitoring.

[Operation of the Partial Synchronization Processing Unit]

Figure 10:
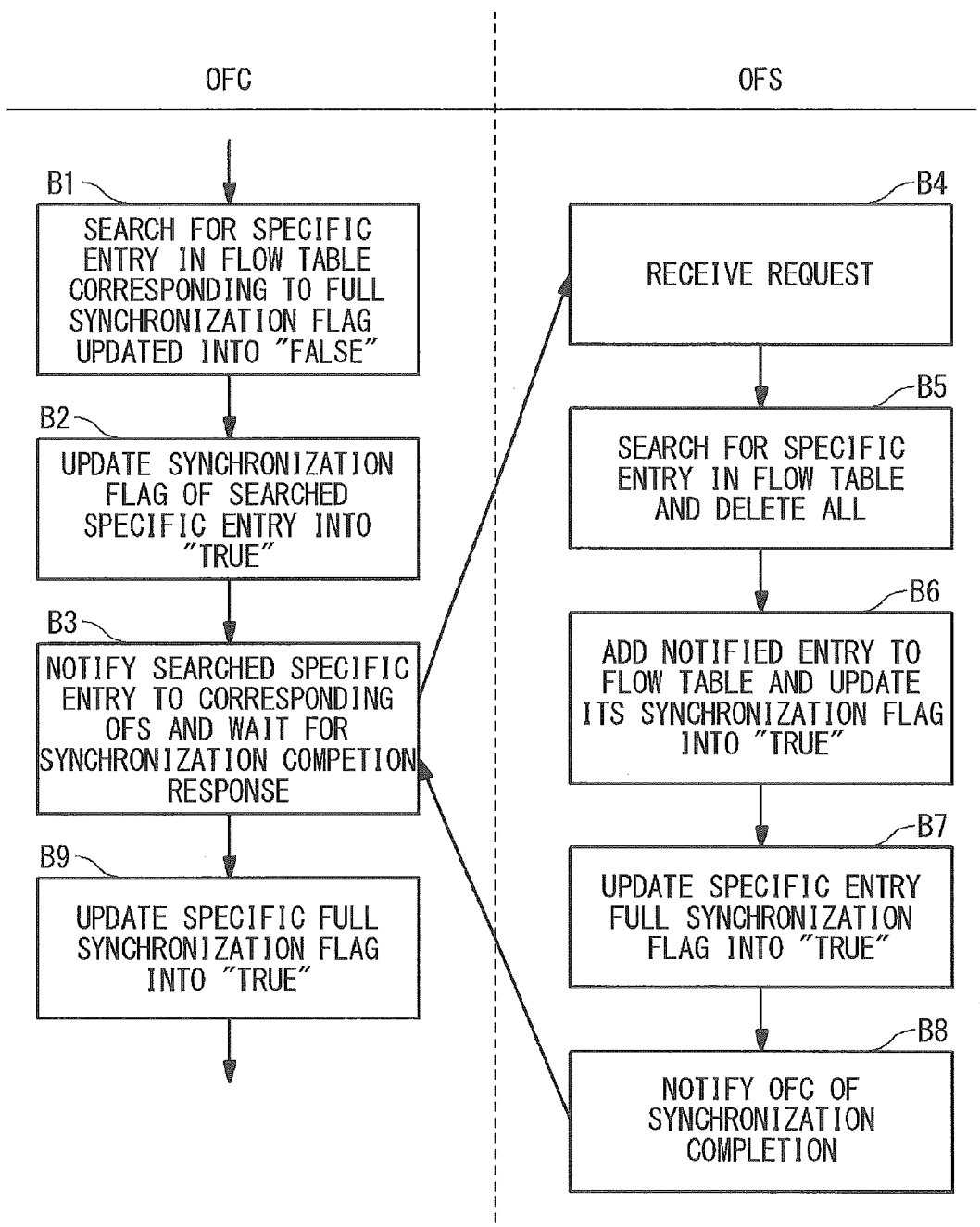
FIG. 10 is a flowchart showing operations of a partial synchronization processing section.

Operations of the partial synchronization processing unit 13 of the controller (OFC) 10 and the partial synchronization processing unit 23 of the switch (OFS) 20 will be described by referring to FIG. 10.

Now, the values of each specific entry full synchronization flag of both the controller (OFC) 10 and the switch (OFS) 20 are supposed to be updated from "true" into "false".

(1) Step B1

The partial synchronization processing unit 13 of the controller (OFC) 10 detects an update of the specific entry full synchronization flag and begins the operation (partial audit process). For example, the partial synchronization processing unit 13 is implemented in a configuration such as an event handler which operates when the specific entry full synchronization flag value is updated from "true" into "false". First, the partial synchronization processing unit 13 refers to the flow table of the controller (OFC) 10 to search for all specific entries. The specific entries include BC entries, MC entries and wild card entries. A BC entry is a flow entry with a broadcast address described in its rule. An MC entry is a flow entry with a multicast address described in its rule. A wild card entry is a flow entry with one or more "*" or "?" is described in the specific four columns of its rule. Consequently, the search is simple.

(2) Step B2

Next, the partial synchronization processing unit 13 updates the values of synchronization flag of all specific entries found by the search into "true".

(3) Step B3

Next, the partial synchronization processing unit 13 requests a synchronization of specific entries to the switch (OFS) 20 by giving information of all specific entries found by search to a specific entry synchronization request and notifying the switch (OFS) 20, then waits for a response of synchronization completion from the switch (OFS) 20.

(4) Step B4

The partial synchronization processing unit 23 of the switch (OFS) 20 receives a specific entry synchronization request with specific entry information (notification of specific entry information) from the partial synchronization processing unit 13 of the controller (OFC) 10 and begins a specific entry synchronization process.

(5) Step B5

The partial synchronization processing unit 23 searches in the flow table of the switch (OFS) 20 for all specific entries given to the specific entry synchronization request and deletes all specific entries found by the search.

(6) Step B6

Next, the partial synchronization processing unit 23 additionally registers all specific entries given to the specific entry synchronization request to the flow table of the switch (OFS) 20 and updates the synchronization flag value of the additionally registered specific entries into "true".

(7) Step B7

Next, the partial synchronization processing unit 23 updates the specific entry full synchronization flag value of the switch (OFS) 20 into "true".

(8) Step B8

Next, the partial synchronization processing unit 23 notifies the specific entry full synchronization completion to the controller (OFC) 10.

(9) Step B9

The partial synchronization processing unit 13 of the controller (OFC) 10 receives the notification of the specific entry full synchronization completion from the partial synchronization processing unit 23 of the switch (OFS) 20 and updates the specific entry full synchronization flag value of the controller (OFC) 10 into "true".

[Operations of the Packet Processing Unit]

Operations of the packet processing unit 24 of the switch (OFS) 20 will be described by referring to FIG. 11.

(1) Step C1

The packet processing unit 24 of the switch (OFS) 20 begins the operations when receiving a packet transferred from a host or other switches to verify whether the specific entry full synchronization flag value is "true".

(2) Step C2

In a case where the specific entry full synchronization flag value is "false", the packet processing unit 24 discards the relevant packet.

(3) Step C3

In a case where the specific entry full synchronization flag value is "true", the packet processing unit 24 refers to the header information or the like of the relevant packet to investigate L1-L4 information (attributes) of the relevant packet and search for a matching flow entry in the flow table of the switch (OFS) 20. In this search, all specific entries and all ordinary entries are subjects of search.

(4) Step C4

As a result of the search, the packet processing unit 24 verifies whether a specific entry matching to the relevant packet (for whole rules) is found.

(5) Step C5

In a case where no specific entry matching to the relevant packet (for whole rules) is found, the packet processing unit 24 verifies whether an ordinary entry of which specific four columns match with the relevant packet is found.

(6) Step C6

In a case where an ordinary entry of which specific four columns match to the relevant packet is found, the packet processing unit 24 verifies whether the synchronization flag value of the found ordinary entry is "true".

(7) Step C7

In a case where no ordinary entry of which specific four columns match to the relevant packet is found as a result of the search, or in a case where the synchronization flag value of the found ordinary entry is not "true" but "false", the packet processing unit 24 transmits a path calculation request to the controller (OFC) 10 and waits for the path calculation completion. The path calculating unit 14 of the controller (OFC) 10 performs the path calculation in response to the path calculation request and additionally registers an ordinary entry of which the synchronization flag value is "true" in the flow table of the switch (OFS) 20, as a result of the path calculation. Or, the path calculating unit 14 updates from "false" into "true" the synchronization flag value of an ordinary entry of which the synchronization flag value is "false". In addition, the partial synchronization processing unit 13 of the controller (OFC) 10 performs a partial synchronization process if necessary during the path calculation. It should be noted that the additional registering of an ordinary entry on the switch (OFS) 20 side is performed by the flow table managing unit 22 of the switch (OFS) 20 in response to an instruction from the controller (OFC) 10. In addition, the update of the synchronization flag value on the switch (OFS) 20 side is performed by the synchronization flag changing unit 221 of the flow table managing unit 22 in response to an instruction from the controller (OFC) 10.

(8) Step C8

The packet processing unit 24 selects a flow entry of highest priority among matching flow entries, refers to the action of the selected flow entry and processes the packet in accordance with the described content. For example, the packet processing unit 24 performs processes such as "transferring a packet to a host or other switch", "discarding a packet" or the like.

[Operations of the Path Calculating Unit]

Operations of the path calculating unit 14 of the controller (OFC) 10 will be described by referring to FIG. 12.

(1) Step D1

The path calculating unit 14 of the controller (OFC) 10 receives the path calculation request issued by the switch (OFS) (see step C7). The path calculating unit 14 begins operations in response to this path calculation request. It should be noted that this path calculation request is supposed to store, at least, information L1-L4 (attributes) of destination and source of the packet which is originally received by the switch (OFS) 20 and is subject of the relevant path calculation (first packet). In practice, the path calculation request might store a copy (duplicate) of the first packet.

(2) Step D2

The path calculating unit 14 picks out (extracts) information L1-L4 (attributes) of source and destination of the first packet from the received path calculation request.

(3) Step D3

The path calculating unit 14 searches in the flow table of the controller (OFC) 10 for an ordinary entry, of which the synchronization flag value is "true" and of which specific four columns match to pick-upped information L1-L4 (attributes).

(4) Step D4

The path calculating unit 14 verifies, as a result of the search, whether one or more ordinary entry of which the synchronization flag value is "true" and of which specific four columns match to pick-upped information L1-L4 (attributes) is found.

(5) Step D5

In a case where one or more ordinary entry of which the synchronization flag value is "true" and of which specific four columns match to pick-upped information L1-L4 (attributes) is found, the path calculation unit 14 verifies whether an ordinary entry, of which not only specific four columns but all the rules match to the first packet, exists among the found ordinary entries or not.

(6) Step D6

In a case where one or more ordinary entry with which all rules match is found, the path calculating unit 14 updates the synchronization flag column of all of the found ordinary entries into "true".

(7) Step D7

The path calculation unit 14 notifies all of the ordinary entries which have been found to the switch (OFS) 20. For example, the path calculation unit 14 transmits to the switch (OFS) 20 a control message for registering all of the ordinary entries which have been found to the flow table of the switch (OFS) 20.

(8) Step D8

In a case where no matching ordinary entry has been found, the path calculating unit 14 needs to register to the switch (OFS) 20 an ordinary entry in which is described the destination of the first packet and thus, a path calculation will be needed. At that time, before calculating the path, the path calculating unit 14 collects all of the ordinary entries related to the first packet from all of the flow tables (flow tables of all of the switches (OFS) under the control) of the controller (OFC) 10. That is, the path calculating unit 14 searches in all flow tables the controller (OFC) 10 has for all of the ordinary entries of which the specific four columns match with the first packet and synchronizes, without distinguishing whether the state is already or not yet synchronized or whether the entry is specific or ordinary.

(9) Step D9

The path calculating unit 14 executes the path calculation. Herein, the path calculating unit 14 calculates the path with the Dijkstra's algorithm. Both of "topology information" and "ordinary entry information" are needed to be inputted for the path calculation. The topology information is connection information of hosts, switches and the like which constitute the relevant network and is registered to the controller (OFC) 10 in advance by a network administrator or the like. Ordinary entry information is information of all of the ordinary entries which match with the relevant packet among the ordinary entries already registered to each switch and collected at path calculation. Therefore, the path calculation is possible at this time. As a result of the path calculation, the path calculating unit 14 obtains an ordinary entry to register to a switch (OFS) 20 under control.

(10) Step D10

The path calculating unit 14 additionally registers the ordinary entry obtained as a result of the path calculation to the flow table of the controller (OFC) 10. For example, the path calculating unit 14 instructs the flow table managing unit 12 of the controller (OFC) 10 to additionally register the relevant ordinary entry to the flow table of the controller (OFC) 10. At that time, the synchronization flag changing unit 121 of the flow table managing unit 12 of the controller (OFC) 10 updates the synchronization flag value of the ordinary entry additionally registered to the flow table into "true".

(11) Step D11

Next, the path calculating unit 14 reflects the ordinary entry additionally registered to the flow table of the controller (OFC) 10 to the flow table of the switch (OFS) 20. For example, the path calculating unit 14 transmits a control message to the switch (OFS) 20 to instruct the flow table managing unit 22 of the switch (OFS) 20 to additionally register the relevant ordinary entry to the flow table of the switch (OFS) 20. In response to the instruction, the flow table managing unit 22 of the switch (OFS) 20 additionally registers the relevant ordinary entry to the flow table of the switch (OFS) 20. At that time, the synchronization flag changing unit 221 of the flow table managing unit 22 of the switch (OFS) 20 updates the synchronization flag value of the ordinary entry additionally registered to the flow table of the switch (OFS) 20 into "true".

By above processes, the controller (OFC) 10 completes the additional registration and synchronization of the ordinary entry necessary to the packet transfer and the switch (OFS) 20 becomes able to execute the packet transfer in the step C8.

[Actual Operations when a Packet Arrives]

Actual operations when a packet arrives to a switch (OFS) 20 will be described by referring to FIGS. 13 and 14.

The controller (OFC) 10 is supposed to manage the switch (OFS) 20. A packet is supposed to arrive to the switch (OFS) 20 at an arbitrary timing. In this case, "pattern 1" to "patterns 5" shown in FIG. 13 show a summary of in which state is the flow entry which matches with the relevant packet.

Figure 13:
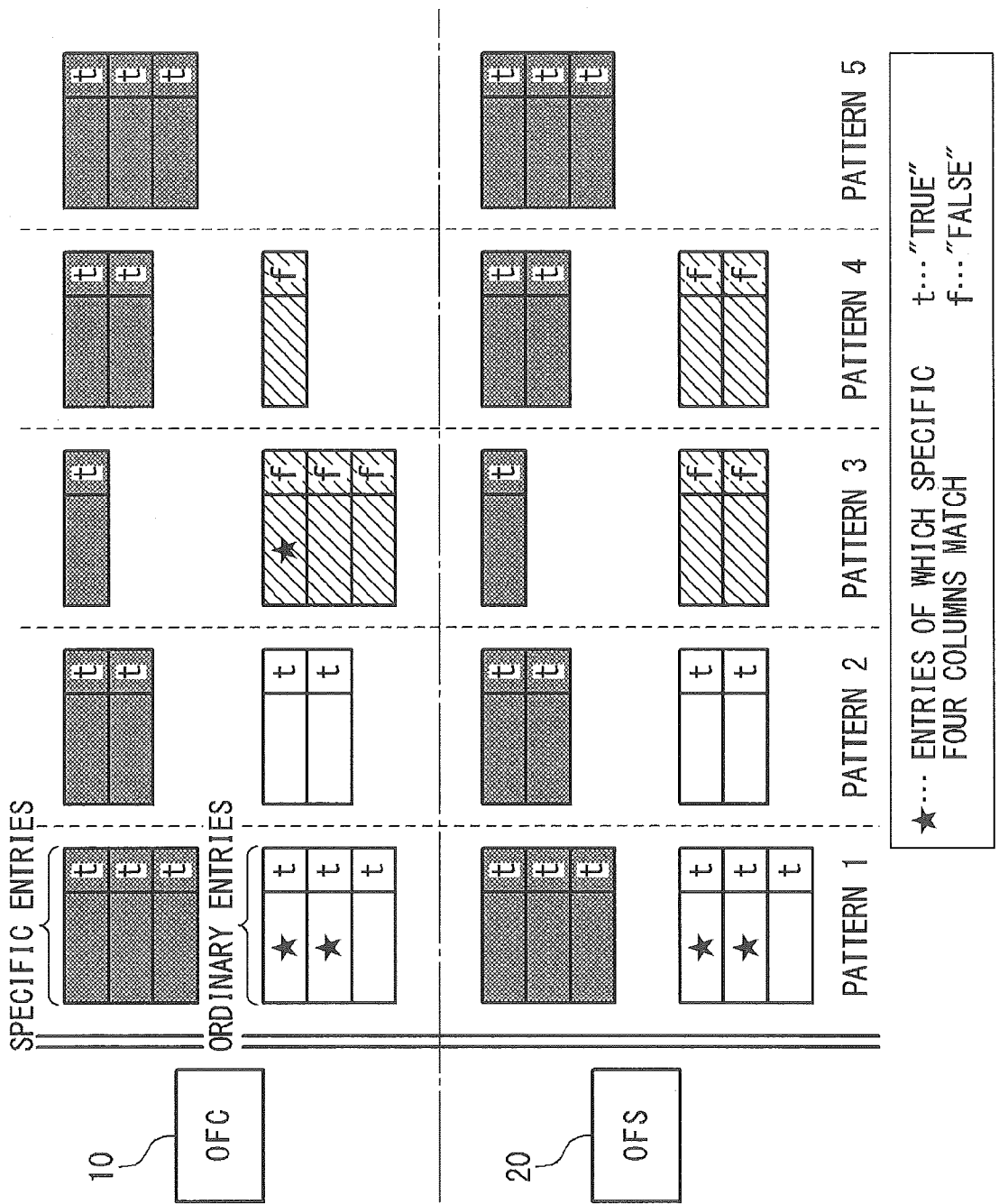
FIG. 13 is a diagram for describing about actual operations when a packet arrives.
Figure 14:
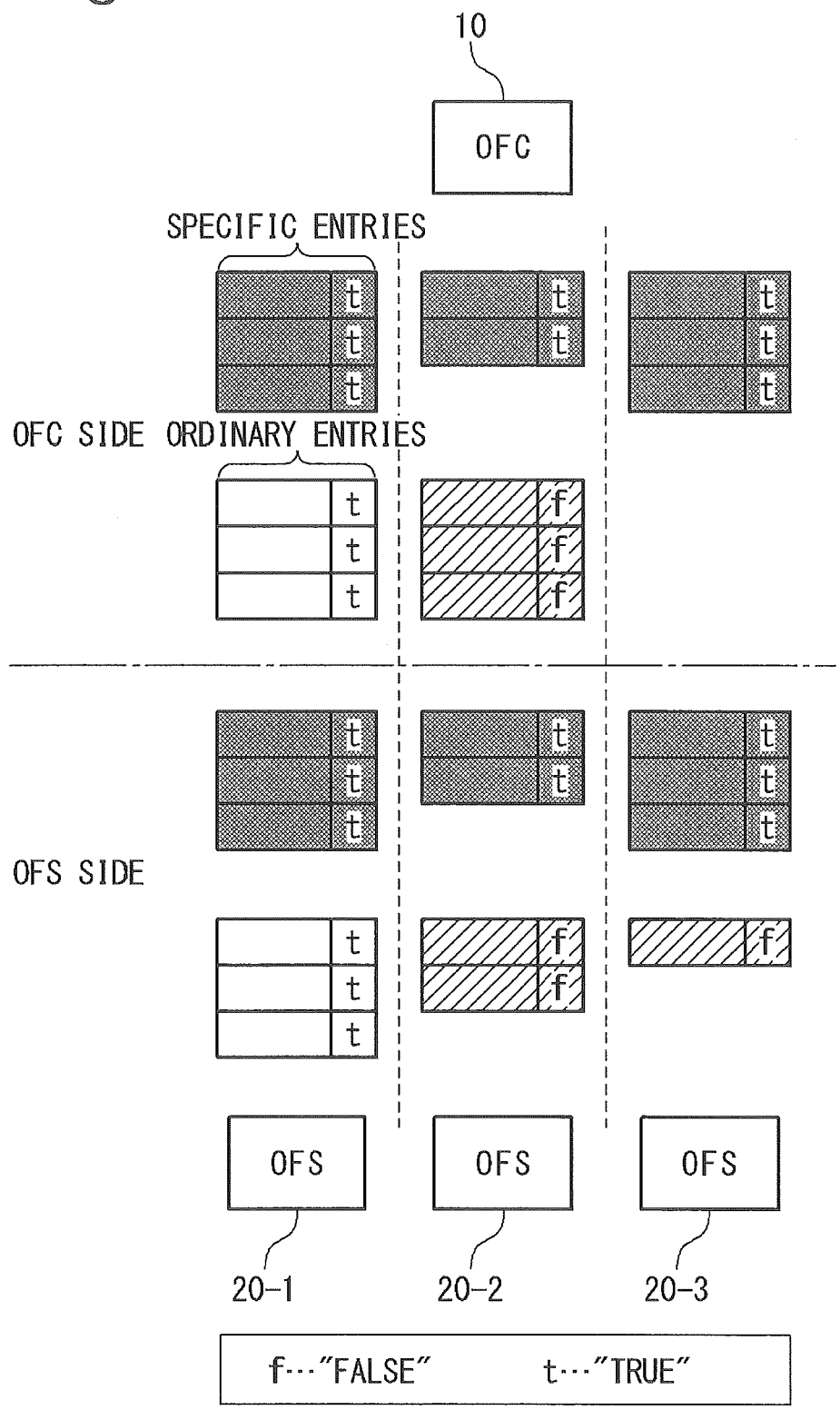
FIG. 14 is a diagram for describing about details of operations of other switches (OFS) to collect flow entries.

Sections (in the controller (OFC) side) higher than the horizontal line (separator line) in FIGS. 13 and 14 show flow entries related to the relevant packet among flow entries in the flow table of the controller (OFC) 10.

Sections (in the switch (OFS) side) lower than the horizontal line (separator line) in FIGS. 13 and 14 show flow entries related to the relevant packet among flow entries in the flow table of the switch (OFS) 20.

Herein, the flow entries related to the relevant packet mean a set of specific entries matching with the packet (in whole rules) and ordinary entries of which specific four columns match with the packet.

It should be noted that flow entries colored (filled) in "grey" show specific entries matching with the first packet (in whole rules).

In addition, flow entries in "white" (not colored) show ordinary entries of which synchronization flag value is "true".

In addition, flow entries with "hatching lines" show ordinary entries of which synchronization flag value is "false".

In addition, flow entries with "star sign" show ordinary entries of which specific four columns match with the first packet.

In the example shown in FIG. 13, in a case where the controller (OFC) 10 searches in its own flow table for flow entries matching with the first packet, zero or more "specific entry" will be detected in respective flow tables. At that time, the detected specific entry is necessarily in a synchronized state and the synchronization flag value is "true".

The switch (OFS) 20 holds entries of which contents are completely identic to those specific entries. Those entries are in a synchronized state and the synchronization flag value is "true".

On the other hand, in a case where the controller (OFC) 10 and/or the switch (OFS) 20 search in its own/their own flow table for a flow entry matching with the first packet, zero or more "ordinary entry of which specific four columns match" will be detected. At that time, synchronization state (and synchronization flag value) of the detected ordinary entry is (are) various. Combination shown as pattern 1 to pattern 5 can be considered as synchronization state of the detected ordinary entry.

[Pattern 1]

The pattern 1 shows a case where the ordinary entry is already synchronized and its specific four columns match. That is, it is a case where synchronized ordinary entries corresponding to the ordinary entry in the flow table of the controller (OFC) 10 exist in the flow table of the switch (OFS) 20 and an ordinary entry of which specific four columns match with the received packet exists among those synchronized ordinary entries.

In this case, no path calculation is needed.

Figure 11:
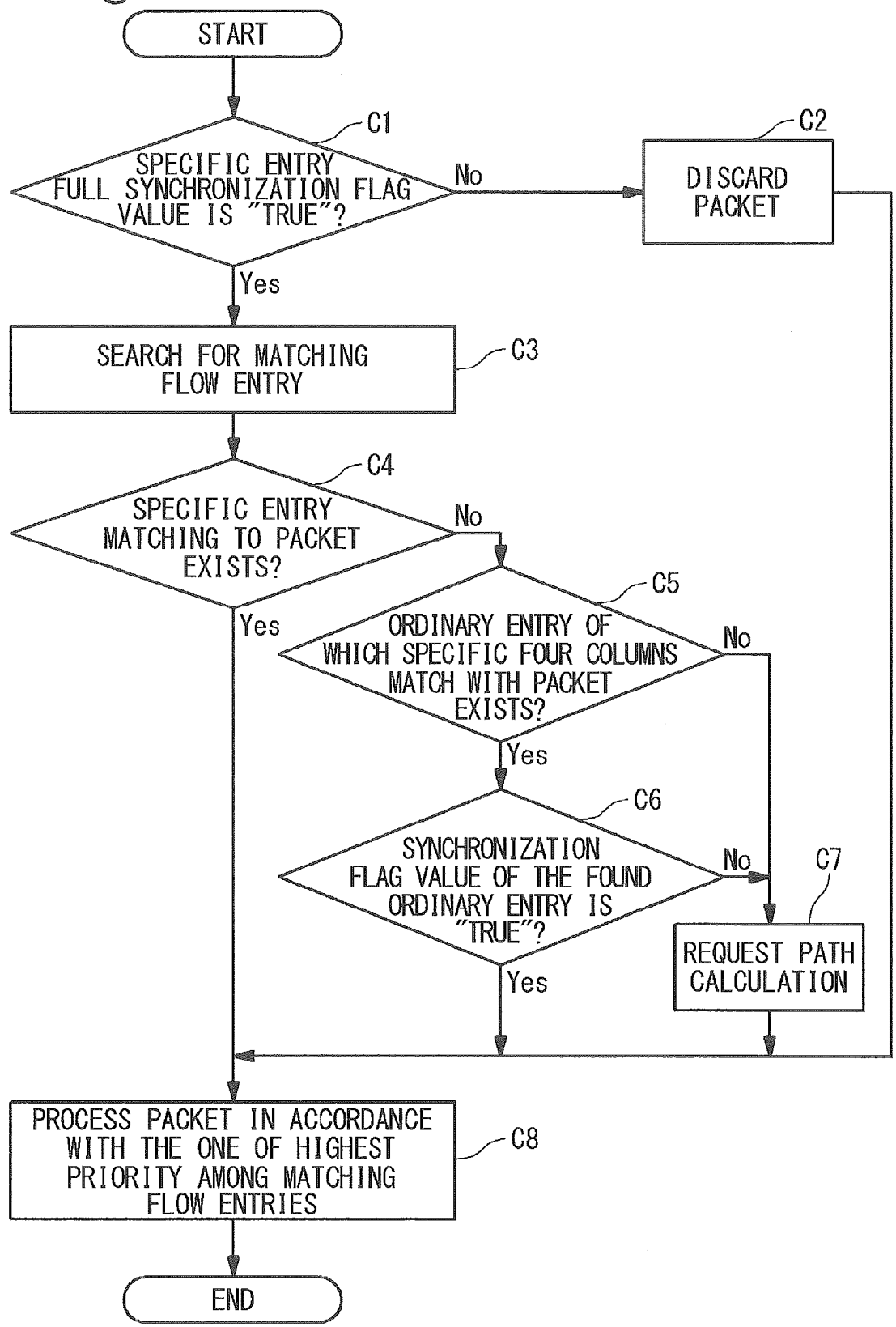
FIG. 11 is a flowchart showing operations of a packet processing section.

For example, as shown in the step C8 in FIG. 11, the switch (OFS) 20 selects the flow entry of which the priority is highest among matching flow entries, refers to the action of the selected flow entry and processes the packet on a basis of the described content.

[Pattern 2]

The pattern 2 shows a case where ordinary entries are already synchronized but specific four columns do not match. That is, it is a case where synchronized ordinary entries corresponding to ordinary entries in the flow table of the controller (OFC) 10 exist in the flow table of the switch (OFS) 20 but no ordinary entry of which specific four columns match with the received packet exist among those synchronized ordinary entries.

In this case, the path calculation is needed.

Figure 12:
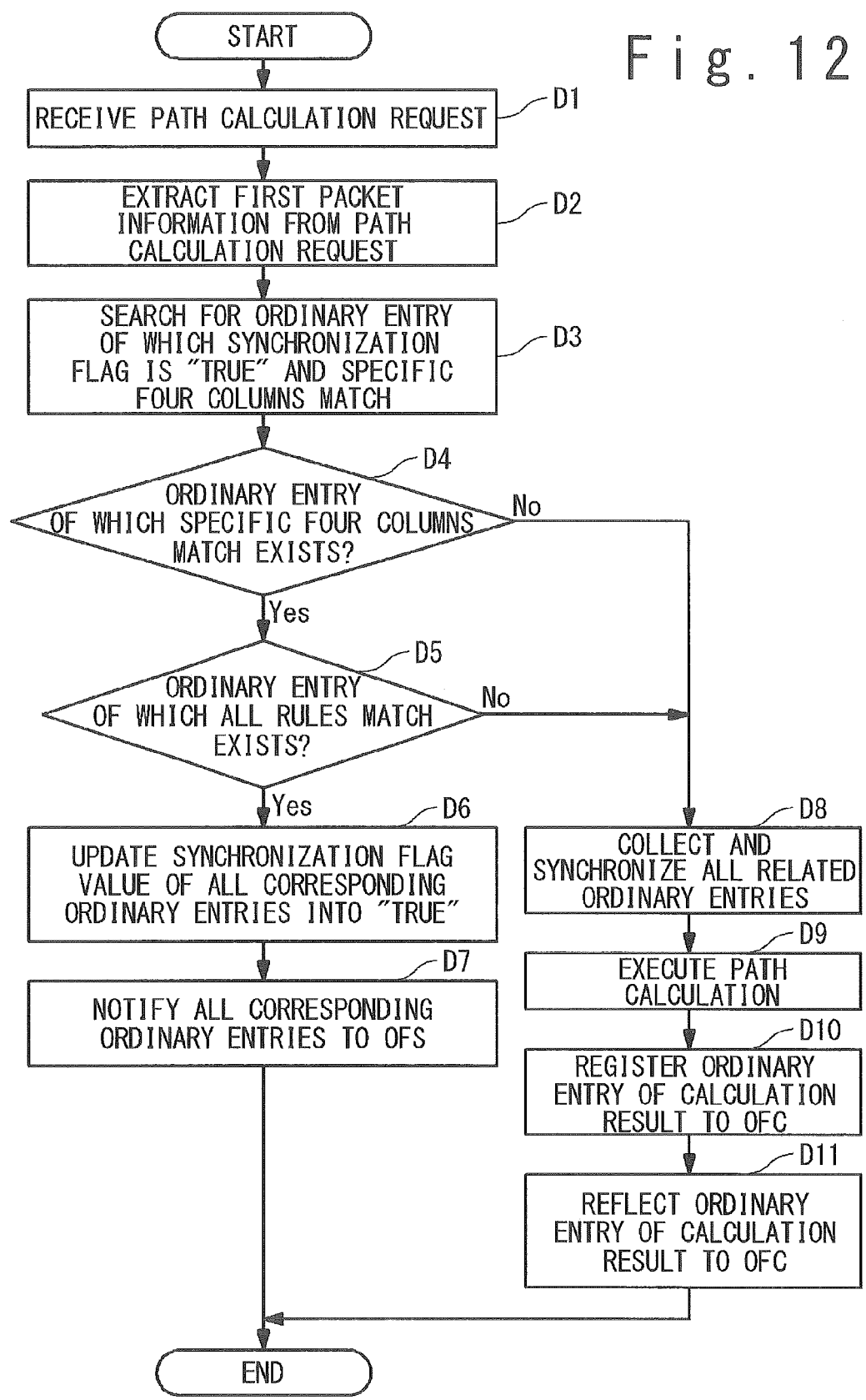
FIG. 12 is a flowchart showing operations of a path computing section.

For example, as shown in steps D8 to D11 in FIG. 12, the controller (OFC) 10 registers the ordinary entry obtained as a result of the path calculation to its own flow table and reflects to the flow table of the switch (OFS) 20.

At that time, as shown in the step D8 in FIG. 12, the controller (OFC) 10 needs to collect flow entries matching to the first packet for other switches (OFS) constituting the network too. In addition, in a case where flow entries which are not yet synchronized have been collected while synchronization process for other switches (OFS), the controller (OFC) 10 will be supposed to synchronize at same time flow entries of other switches (OFS) which are not yet synchronized too.

Details of operations for collecting flow entries of other switches (OFS) will be described later, by referring FIG. 14.

[Pattern 3]

The pattern 3 shows a case where the ordinary entry is not yet synchronized but the specific four columns match. That is, it is a case where ordinary entries which are not yet synchronized and correspond to the ordinary entry in the flow table of the controller (OFC) 10 exist in the flow table of the switch (OFS) 20 and an ordinary entry of which specific four columns match with the received packet exists among those ordinary entries which are not yet synchronized.

In this case also, no path calculation is needed.

For example, in the step C6 in FIG. 11, because the synchronization flag value of the found ordinary entry is not "true" but "false", the switch (OFS) 20 transmits a path calculation request to the controller (OFC) 10 and waits for the path calculation to be completed, as shown in the step C7 in FIG. 11.

However, on the controller (OFC) 10 side, a flow entry which is not yet synchronized will be found, without needing a new calculation.

In this case, the controller (OFC) 10 updates the synchronization flag value of the found ordinary entry which is not yet synchronized from "false" to "true". And then, the controller (OFC) 10 reflects this ordinary entry to the switch (OFS) 20 with the synchronization flag value to be "true". At that time, the controller (OFC) 10 updates by overwriting the ordinary entry which is already registered to the switch (OFS) 20 and not yet synchronized. As a result, the ordinary entry which is not yet synchronized and already registered to the switch (OFS) 20 becomes a synchronized ordinary entry.

The switch (OFS) 20 becomes capable of packet transmitting in accordance with the synchronized ordinary entry.

[Pattern 4]

The pattern 4 shows a case where the ordinary entries are not yet synchronized and specific four columns do not match. That is, it is a case where ordinary entries which are not yet synchronized and correspond to ordinary entries in the flow table of the controller (OFC) 10 exist in the flow table of the switch (OFS) 20 and however no ordinary entry of which specific four columns match with the received packet exists among the ordinary entries which are not yet synchronized.

In this case, path calculation is needed.

For example, in the step C5 in FIG. 11, in a case where no ordinary entry of which specific four columns do not match with the relevant packet is not found as a search result, or, in a case where, an ordinary entry of which specific four columns match with the relevant packet is found and however, in the step C6 in FIG. 11, the synchronization flag value of the found ordinary entry is not "true" but "false", the switch (OFS) 20 transmits a path calculation request to the controller (OFC) 10 and waits for the path calculation to be completed, as shown in the step C7 in FIG. 11.

The controller (OFC) 10 performs the path calculation in response to the path calculation request and additionally registers an ordinary entry of which the synchronization flag value is "true" to the flow table of the switch (OFS) 20 as a result of the path calculation.

At that time, as shown in the step D8 in FIG. 12, the controller (OFC) 10 needs to collect flow entries matching to the first packet for other switches (OFS) constituting the network too. In addition, in a case where a flow entry which is not yet synchronized has been collected during synchronization process for other switches (OFS), the controller (OFC) 10 is supposed to synchronize at same time ordinary entries of other switches (OFS) which are not yet synchronized.

Details of operations for collecting flow entries of other switches (OFS) will be described later, by referring FIG. 14.

[Pattern 5]

The pattern 5 shows a case where an ordinary entry per se does not exist. That is, no ordinary entry corresponding to an ordinary entry in the flow table of the controller (OFC) 10 exists in the flow table of the switch (OFS) 20, regardless of the synchronization state.

In this case, a path calculation is needed.

For example, in the step C5 in FIG. 11, in a case where no ordinary entry of which specific four columns match with the relevant packet is found as a search result, the switch (OFS) 20 transmits a path calculation request to the controller (OFC) 10 and waits for the path calculation to be completed, as shown in the step C7 in FIG. 11.

In response to the path calculation request, the controller (OFC) 10 performs the path calculation and additionally registers one ordinary entry of which the synchronization flag value is "true" to the flow table of the switch (OFS) 20 as a result of the path calculation.

At that time, as shown in the step D8 in FIG. 12, the controller (OFC) 10 needs to collect flow entries matching with the first packet, for other switches (OFS) constituting the network too. In addition, in a case where a flow entry which is not yet synchronized has been collected during the synchronization process for other switches (OFS), the controller (OFC) 10 is supposed to synchronize the flow entry which is not yet synchronized of other switches (OFS) in a same time too.

Details of operations of collecting flow entries of other switches (OFS) will be described later, by referring FIG. 14.

[Details of Operation of Collecting Flow Entries of Other Switches (OFS)]

Next, Details of operations of collecting flow entries of other switches (OFS) will be described, by referring FIG. 14. It should be noted that those operations correspond to the step D8 in FIG. 12.

Herein, the controller (OFC) 10 is supposed to start a path calculation for a packet received from the switch (OFS) 20. In addition, the controller (OFC) 10 is supposed to manage three switches, which are other switches constituting the network, the switch (OFS) 20-1, the switch (OFS) 20-2 and the switch (OFS) 20-3.

The controller (OFC) 10 collects flow entries, which are already registered to the switches (OFS) 20-1 to 20-3 and related to the first packet, while the path calculation.

FIG. 14 shows the states of the flow entries of the switches (OFS) 20-1 to 20-3 at that time.

(1) The State of the Flow Entries of the Switch (OFS) 20-1.

All of the flow entries related to the first packet of the switch (OFS) 20-1 are already registered and synchronized.

In this case, the controller (OFC) 10 only has to simply collect the flow entries related to the same first packet from the flow table of the controller (OFC) 10.

(2) The State of the Flow Entries of the Switch (OFS) 20-2.

In the switch (OFS) 20-2, a portion of flow entries related to the first packet is not yet synchronized. Herein, one extra ordinary entry of which synchronization flag value is "false" exists in the flow table of the controller (OFC) 10.

In this case, the controller (OFC) 10 updates the synchronization flag value of this ordinary entry from "false" to "true" and additionally registers the ordinary entry of which the synchronization flag value has been updated into "true" to the switch (OFS) 20-2.

It should be noted that, in a case where this ordinary entry is already registered to the switch (OFS) 20-2 and simply is not synchronized, the controller (OFC) 10 updates the synchronization flag value of this ordinary entry from "false" to "true" and additionally registers by overwriting the ordinary entry which is already registered to the switch (OFS) 20-2. As a result, the synchronization flag value of the ordinary entry which is already registered to the switch (OFS) 20-2 is updated from "false" to "true".

(3) The State of the Flow Entries of the Switch (OFS) 20-3.

In the switch (OFS) 20-3, a portion of flow entries related to the first packet is not yet synchronized. Herein, one ordinary entry of which the synchronization flag value is "false" exists only in the flow table of the switch (OFS) 20-3.

In this case, the controller (OFC) 10 determines that this ordinary entry is not registered to the switch (OFS) 20-3 and deletes the ordinary entry from the switch (OFS) 20-3.

In this way, in a case where flow entries which were originally registered to the switch (OFS) and are not yet synchronized exist, the controller (OFC) 10 deletes them.

As a result, necessary flow entry information is completed in a synchronized state and the controller (OFC) 10 becomes able to calculate the path.

The flow entry obtained as a result of the path calculation is registered to each of flow tables of the controller (OFC) 10 and each switch (OFS), as shown insteps D10 and D11 in FIG. 12.

At that time, the states of the controller (OFC) 10 and each switch (OFS) are in a state of the "pattern 2", "pattern 4" or "pattern 5" shown in FIG. 13.

First, the controller (OFC) 10 registers to its own flow entry the flow entry obtained as a result after having updated the synchronization flag value into "true".

Next, the controller (OFC) 10 registers, to the flow entries of each switch (OFS) too, the flow entry obtained as a result of the path calculation, with the synchronization flag value as "true".

At that time, there is a case where the flow entry obtained as a result of the path calculation is included in a specific entry which is already registered. In this case, the relevant entry is supposed to be registered with a higher priority than the registered specific entry. This is a devise necessary so that, in a case where a same packet arrives again to the switch (OFS), the arrived packet matches with the flow entry obtained as a result of the path calculation before the registered specific entry.

Effects of the Present Invention

Effects of the present invention will be described below.

The present invention enables a management of a synchronization state per unit of flow entry, by use of "entry synchronization flag changing process" and "partial synchronization process", and thus synchronization per unit of flow entry becomes possible.

In addition, the present invention enables synchronization by selecting only flow entries necessary for a path calculation, by use of "entry synchronization flag changing process" and "partial synchronization process". As a result, synchronization of entries which are not necessary for the path calculation have not to be waited and thus waiting time unnecessary for path calculation disappears.

In addition, the present invention enables to eliminate the period during which the calculation result is incorrect, which conventionally occurred and thus the service degeneracy time, which occurs in a case like of cluster switch case where secure channel is disconnected, can be shortened.

[Reason of Service Degeneracy Time Shortening]

Reason for which the service degeneracy time can be shortened will be described, by referring to FIG. 15.

In the present invention, the controller (OFC) synchronizes wild card entries, in addition to BC entries and/or MC entries, at the beginning of the "audit process" (synchronization process). The switch (OFS) discards the first packet arrived during the "audit process".

Therefore, in comparison with the above implementation example C, the time for discarding packets is slightly longer, by the amount of the synchronization process of wild card entries.

However, on the other hand, since the time during which the path calculation is incorrect is eliminated, the total length of the service degeneracy time is significantly decreased in consequence.

<Exemplary Hardware>

Detailed examples of hardware to realize a network system related to the present invention will be described below.

As an example of the controller (OFC) 10 and the hosts 30, a computer such as a PC (Personal Computer), an appliance, a thin client server, a workstation, a main frame, a super computer and the like is supposed. In addition, as an example of the hosts 30, a mobile telephone, a smart phone, a smart book, a car navigation system, a portable game device, a home-use game device, a portable music player, a handy terminal, an electronic gadget, an interactive television, a digital tuner, a digital recorder, an information home appliance, an office automation device, a store terminal or a high-performance photocopy machine, a digital signage or the like. It should be noted that the controller (OFC) 10 and the hosts 30 can be, not only a terminal and a server, but also a relaying device or a peripheral device. In addition, the controller (OFC) 10 and the hosts 30 can be an expansion board mounted on a computer or the like or a VM (virtual machine) built on a physical machine.

As examples of the switch (OFS) 20 can be considered a network switch, a router, a proxy, a gateway, a firewall, a load balancer, a packet shaper, a SCATA (Supervisory Control And Data Acquisition), a gatekeeper, a base station, an AP (Access Point), a CS (Communication Satellite), or a computer with a plurality of communication ports. In addition, it can also a virtual switch realized by a VM built on a physical machine.

The controller (OFC) 10, the switch (OFS) 20 and the hosts 30 can be mounted on a moving body such as a vehicle, a ship, an aircraft or the like.

Each one of the controller (OFC) 10 and the switch (OFS) 20 is realized by a processor which executes predetermined processes by driving on a basis of a program, a memory which stores the relevant program and various types of data and an interface used for communication with a network.

As examples of the above processor, a CPU (Central Processing Unit), an NP (Network Processor), a microprocessor, a microcontroller, an LSI (Large Scale Integration) or the like can be considered.

As examples of the above memory, a RAM (Random Access Memory), a ROM (Read Only Memory), en EEPROM (Electrically Erasable and Programmable Read Only Memory), a semiconductor storage device such as a flash memory or the like, an auxiliary storage device such as a HDD (Hard Disk Drive), a SSD (Solid State Drive) or the like, a removable disk such as a DVD (Digital Versatile Disk), a storage medium such as a SD (Secure Digital) memory card and the like, or the like can be considered. In addition, it can be a buffer, a register or the like. Or else, it can be a storage device using a DAS (Direct Attached Storage), a FC-SAN (Fiber Channel-Storage), a NAS(Network Attached Storage), an IP-SAN (IP-Storage Area Network) or the like.

It should be noted that the above processor and the above memory can be integrated. For example, in recent years, integration of microcomputer and the like into one chip is promoted. Therefore, a case may be considered where a one-chip microcomputer mounted on an electric device or the like comprises the above processor and the above memory.

As an example of the above interface, a semiconductor integrated circuit such as a substrate (mother board, I/O board) or a chip corresponding to a network communication, a network adaptor such as a NIC (Network Interface Card) or a similar expansion card, communication device such as an antenna, a communication port such as a connector and the like can be considered.

In addition, as an example of network, internet, LAN (Local Area Network), wireless LAN, WAN (Wide Area Network), back bone, CATV (CAble TeleVision) line, fixed telephone network, mobile telephone network, WiMAX (IEEE 802.16a), 3G (third Generation), lease line, IrDA (Infrared Data Association), Bluetooth (registered trademark), serial communication line, data bus and the like can be considered.

It should be noted that components inside each of the controller (OFC) 10 and the switch (OFS) 20 can be a module, a component, or a dedicated device, or a program to launch (call) those devices.

It should be noted that in practice those examples are note limitative.

<Features of the Present Invention>

In the present invention, in an OpenFlow network, the controller (OFC) and the switch (OFS) ameliorate the synchronization process of the flow table. Specifically, the controller (OFC) manages the synchronization state of the flow entries which constitute each flow table per unity of flow entry so that only specific flow entries can be synchronized with the switch (OFS) side at first. As a result, an effect of decreasing the service degeneracy time, which occurs at failures or cluster switching, can be obtained.

The present invention can be applied to use for process of synchronizing flow tables in an OpenFlow network. That is, in a C/U separation type network system, the present invention can be applied to a use for process of synchronizing path information between the control device and node device.

APPENDIX

A part or the whole of the above exemplary embodiments can be described as appendixes below. However, in practice, the present invention is not limited to the below described examples.

Appendix 1

A network system comprising:
a switch which performs a process to a received packet in accordance with a flow entry in which are defined a rule and an action for uniformly controlling a packet as a flow; and
a controller which transmits a control message to the relevant switch and performs a setting of the relevant flow entry,
wherein the relevant controller holds a flow entry identical to the flow entry set to the relevant switch, manages a synchronization state per unity of flow entry and preferentially synchronizes, in a case the flow entry is not synchronized, a specific flow entry between the relevant switch.

Appendix 2

The network system described in the above appendix 1, wherein each of the relevant controller and the relevant switch comprises:
a functional unit which holds a flow table, wherein the flow table is a set of flow entries and is provided a column of synchronization flag for each flow entry, wherein the synchronization flag shows a synchronization state of the relevant flow entry;
a functional unit which holds a specific entry synchronization flag, wherein a part of flow entries (broadcast and/or multicast flow entry, flow entry including a wild card and the like) is a specific entry and wherein the specific entry synchronization flag shows a synchronization state of a specific entry; and
a functional unit which updates, in a case of detecting a communication interruption of a secure channel, values of the synchronization flag of all flow entries and specific entry synchronization flag into "false".

Appendix 3

The network system described in the above appendix 2, wherein the relevant controller further comprises:
a functional unit which synchronizes, in a case of detecting the value of the specific entry synchronization flag to be "false", the specific entry and updates into "true" values of synchronization flag and specific entry synchronization flag of the synchronized specific entry in respect to each of the relevant controller itself and the relevant switch; and
a functional unit which synchronizes, in a case where the value of the specific entry synchronization flag is "true" but the packet the switch received and the specific entry do not match, a flow entry of which source and destination match with the received packet and updates the synchronization flag of the synchronized flow entry into "true" in respect to each of the relevant controller itself and the relevant switch.

Appendix 4

The network system described in the appendix 2 or 3, wherein the relevant switch further comprises:

a functional unit which, in a case where the value of the specific entry synchronization flag is "false", discards the received packet;

a functional unit which, in a case where the value of the specific entry synchronization flag is "true", searches for a flow entry matching to the received packet in the flow table of the relevant switch;

a functional unit which verifies whether a specific entry matching to the received packet is found as a result of the search;

a functional unit which, in a case where no specific entry matching with the received packet is found, verifies whether a flow entry of which source and destination match with the received packet is found;

a functional unit which, in a case where a flow entry of which source and destination match with the received packet is found, verifies whether the synchronization flag value of the found flow entry is "true";

a functional unit which, in a case where no flow entry of which source and destination match with the received packet is found or in a case where the value of the synchronization flag of the found flow entry is not "true" but "false", inquires a flow entry related to the received packet to the relevant controller and waits for a response; and a functional unit which selects a flow entry with a highest priority among flow entries matching to the receiving packet, refers to an action of the selected flow entry and processes the packet in accordance with a described content.

<Remarks>

Exemplary embodiments of the present invention have been described above but the present invention is not limited by the above exemplary embodiments in practice and variations in a scope which does not deviate from the summary of the present invention are included in the present invention.

It should be noted that the present application claims priority based on Japanese Patent Application No. 2012-006105 and the disclosed content of the Japanese Patent Application No. 2012-006105 is incorporated to the present application by reference.

The invention claimed is:

1. A network system comprising:

a switch configured to perform processes of a received packet in accordance with a flow entry in which are defined a rule and an action to uniformly control a packet as a flow; and a controller configured to transmit a control message to said switch to perform a setting of said flow entry, holds another flow entry identical to said flow entry set to said switch, manages a synchronization state per unity of a flow entry and preferentially synchronizes, in a case one of said flow entries is not synchronized, a specific flow entry between said switch, wherein each of said controller and said switch comprises:

means configured to hold a flow table, wherein the flow table comprises a set of flow entries and is provided a column of synchronization flag for each flow entry and wherein the synchronization flag shows a synchronization state of a corresponding flow entry;

means configured to hold a specific entry synchronization flag, wherein a part of the flow entries is the specific entry and wherein the specific entry synchronization flag shows a synchronization state of a specific entry; and means configured to update, in a case of detecting a communication interruption of a secure channel, values of synchronization flags and specific entry synchronization flags of all flow entries into "false", wherein said controller further comprises:

means configured to synchronize the specific entry when detecting the specific entry synchronization flag value to be "false" and to update, in respect to each of said controller itself and said switch, the values of the synchronization flag and specific entry synchronization flag of the synchronized specific entry into "true"; and means configured to synchronize, in a case the specific entry synchronization flag value is "true" and the packet the switch received and the specific entry does not match, a flow entry of which source and destination match with the received packet and updating, in respect to each of said controller itself and said switch, synchronization flag of synchronized flow entry into "true".

2. A network system comprising:

a switch configured to perform processes of a received packet in accordance with a flow entry in which are defined a rule and an action to uniformly control a packet as a flow; and a controller configured to transmit a control message to said switch to perform a setting of said flow entry, holds another flow entry identical to said flow entry set to said switch, manages a synchronization state per unity of a flow entry and preferentially synchronizes, in a case one of said flow entries is not synchronized, a specific flow entry between said switch, wherein each of said controller and said switch comprises:

means configured to hold a flow table, wherein the flow table comprises a set of flow entries and is provided a column of synchronization flag for each flow entry and wherein the synchronization flag shows a synchronization state of a corresponding flow entry;

means configured to hold a specific entry synchronization flag, wherein a part of the flow entries is the specific entry and wherein the specific entry synchronization flag shows a synchronization state of a specific entry; and means configured to update, in a case of detecting a communication interruption of a secure channel, values of synchronization flags and specific entry synchronization flags of all flow entries into "false", wherein said switch further comprises:

means configured to discard, in a case the specific entry synchronization flag value is "false", the received packet;

means configured to search, in a case the specific entry synchronization flag value is "true", for a flow entry matching with the received packet in the flow table of said switch;

means configured to verify, whether a specific entry matching with the received packet is found as a result of the search;

means configured to verify, in a case no specific entry matching with the received packet is found, whether a flow entry of which source and destination match with the received packet if found;

means configured to verify, in a case a flow entry of which source and destination match with the received packet is found, whether the synchronization flag value of the found flow entry is "true";

means configured to inquire, in a case no flow entry of which source and destination match with the received packet is found or in a case synchronization flag value of a found flow entry is not "true" but "false", a flow entry related to the received packet to said controller and waiting for a response; and means configured to select, a flow entry of a highest priority among flow entries matching with the received packet, referring to an action of the selected flow entry and processing the packet in accordance with a described content.

3. The controller used in the networks system according to claim 1.

4. The switch used in the network system according to claim 1.

5. A path information synchronizing method comprising:
a switch processing a received packet in accordance with a flow entry in which a rule and an action are defined to uniformly control a packet as a flow;
a controller transmitting a control message to said switch to perform a setting to said flow entry;
said controller holding a flow entry identical to said flow entry set to said switch, managing a synchronization state per unity of a flow entry and preferentially synchronizing, in a case one of the flow entries is not synchronized, a specific flow entry between said switch;
each of said controller and said switch holding a flow table, wherein the flow table comprises a set of flow entries and is provided a synchronization flag column for each flow entry and wherein the synchronization flag shows a synchronization state of a corresponding flow entry;
each of said controller and said switch holding a specific entry synchronization flag, wherein a part of the flow entries comprises a specific entry and wherein the specific entry synchronization flag shows a synchronization state of a specific entry;
each of said controller and said switch, in a case of detecting a secure channel communication disconnection, updating values of synchronization flags and specific entry synchronization flags of all flow entries into "false";
said controller, in a case of detecting the specific entry synchronization flag value to be "false", synchronizing the specific entry and updating, in respect to each of said controller itself and said switch, the values of the synchronization flag and the specific entry synchronization flag of the synchronized specific entry; and
said controller, in a case specific entry synchronization flag value is "true" but the packet said switch received and the specific entry do not match, synchronizing the flow entry of which source and destination match with the received packet and updating, in respect to each of said controller itself and said switch, the synchronization flag of the synchronized flow entry into "true".

6. A path information synchronizing method comprising:
a switch processing a received packet in accordance with a flow entry in which a rule and an action are defined to uniformly control a packet as a flow;
a controller transmitting a control message to said switch to perform a setting to said flow entry;
said controller holding a flow entry identical to said flow entry set to said switch, managing a synchronization state per unity of a flow entry and preferentially synchronizing, in a case one of the flow entries is not synchronized, a specific flow entry between said switch;
each of said controller and said switch holding a flow table, wherein the flow table comprises a set of flow entries and is provided a synchronization flag column for each flow entry and wherein the synchronization flag shows a synchronization state of a corresponding flow entry;
each of said controller and said switch holding a specific entry synchronization flag, wherein a part of the flow entries comprises a specific entry and wherein the specific entry synchronization flag shows a synchronization state of a specific entry;
each of said controller and said switch, in a case of detecting a secure channel communication disconnection, updating values of synchronization flags and specific entry synchronization flags of all flow entries into "false";
said switch, in a case the specific entry synchronization flag value is "false", discarding the received packet;
said switch, in a case the specific entry synchronization flag value is "true", searching for a flow entry matching with the received packet in the flow table of said switch;
said switch verifying whether a specific entry matching with the receiving packet is found as a result of the search;
said switch, in a case no specific entry matching with the received packet is found, verifying whether a flow entry of which source and destination match with the received packet is found;
said switch, in a case a flow entry of which source and destination match with the received packet is found, verifying whether the synchronization flag value of the found flow entry is "true";
said switch, in a case no flow entry of which source and destination match with the received packet is found or in a case the synchronization flag value of the found flow entry is not "true" but "false", inquiring a flow entry related to the received packet to said controller and waiting for a response; and
said switch selecting a flow entry of a highest priority among flow entries matching with the received packet, referring to an action of the selected flow entry and processing the packet in accordance with a described content.

7. A non-transitory recording medium storing a program for an electronic device to execute processes of a controller in a path information synchronizing method according to claim 5.

8. A non-transitory recording medium storing a program for an electronic device to execute processes of a switch in a path information synchronizing method according to claim 5.

9. A non-transitory recording medium storing a program for an electronic device to execute processes of a controller in a path information synchronizing method according to claim 6.

10. A non-transitory recording medium storing a program for an electronic device to execute processes of a switch in a path information synchronizing method according to claim 6.

11. The controller used in the networks system according to claim 2.

12. The switch used in the network system according to claim 2.

* * * * *